United States Patent
Tamura et al.

(10) Patent No.: US 10,067,756 B2
(45) Date of Patent: Sep. 4, 2018

(54) COMMUNICATION APPARATUS, COMMUNICATION SYSTEM, AND COMMUNICATION METHOD

(71) Applicants: Hideki Tamura, Kanagawa (JP); Shigeru Nakamura, Kanagawa (JP)

(72) Inventors: Hideki Tamura, Kanagawa (JP); Shigeru Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 36 days.

(21) Appl. No.: 15/099,788

(22) Filed: Apr. 15, 2016

(65) Prior Publication Data

US 2016/0231996 A1 Aug. 11, 2016

Related U.S. Application Data

(63) Continuation of application No. PCT/JP2014/073705, filed on Sep. 8, 2014.

(30) Foreign Application Priority Data

Nov. 5, 2013 (JP) .................................. 2013-229105

(51) Int. Cl.
*G06F 9/44* (2018.01)
*G06F 8/65* (2018.01)
(Continued)

(52) U.S. Cl.
CPC ................ *G06F 8/65* (2013.01); *G06F 11/00* (2013.01); *G06F 13/00* (2013.01); *H04L 67/10* (2013.01);
(Continued)

(58) Field of Classification Search
CPC ..... G06F 8/61; G06F 8/65; G06F 8/67; G06F 8/68; G06F 8/07
See application file for complete search history.

(56) References Cited

U.S. PATENT DOCUMENTS 6,687,901 B1 2/2004 Imamatsu
6,847,403 B1 1/2005 Forsberg, Jr. et al.
(Continued)

FOREIGN PATENT DOCUMENTS

EP 3 067 799 A1 9/2016
JP H04-195358 7/1992
(Continued)

OTHER PUBLICATIONS

Xu et al., "Metadata Service for Random Frame Reading of Video Stored in Distributed File System", ACM, Dec. 2017, pp. 27-31; <https://dl.acm.org/citation.cfm?id=3175704>.*

(Continued)

*Primary Examiner* — Thuy Dao
*Assistant Examiner* — Ben C Wang
(74) *Attorney, Agent, or Firm* — Oblon, McClelland, Maier & Neustadt, L.L.P.

(57) ABSTRACT

A disclosed communication apparatus includes a receiving unit that receives metadata of update data used for an update; a determination unit that determines, based on a description of the metadata, whether or not there is update data that is subject to advance download in which download of the update data is executed before a point of time at which the update is able to start; a control unit that determines whether or not it is timing to perform the advance download; and an update processing unit that downloads the update data in a case in which the determination unit determines that there is the update data that is subject to the advance download and the control unit determines that it is the timing to perform the advance download.

12 Claims, 19 Drawing Sheets

(51) Int. Cl.
*G06F 13/00* (2006.01)
*G06F 11/00* (2006.01)
*H04N 7/15* (2006.01)
*H04L 29/08* (2006.01)
G06F 8/30 (2018.01)
G06F 8/71 (2018.01)

(52) U.S. Cl.
CPC .............. *H04L 67/34* (2013.01); *H04N 7/15* (2013.01); *H04N 7/152* (2013.01); *G06F 8/31* (2013.01); *G06F 8/71* (2013.01)

(56) References Cited

U.S. PATENT DOCUMENTS

| | | | |
|---|---|---|---|
| 7,707,573 B1 * | 4/2010 | Marmaros | G06F 8/61 709/224 |
| 8,321,510 B1 * | 11/2012 | Queru | G06F 17/30283 709/204 |
| 9,031,382 B1 * | 5/2015 | Kaiser | G11B 27/00 386/248 |
| 9,081,641 B2 | 7/2015 | Nakagawa et al. | |
| 9,201,643 B2 | 12/2015 | Nakamura | |
| 9,321,858 B2 * | 4/2016 | Hagadorn | C08F 10/00 |
| 9,442,711 B2 * | 9/2016 | Koyama | G06F 8/65 |
| 9,864,597 B1 * | 1/2018 | Marmaros | G06F 8/65 |
| 2006/0161314 A1 | 7/2006 | Honmura | |
| 2007/0299870 A1 * | 12/2007 | Finch | G06Q 30/02 |
| 2008/0040712 A1 | 2/2008 | Tanaka | |
| 2011/0238789 A1 * | 9/2011 | Luby | H04N 21/23106 709/219 |
| 2012/0072895 A1 * | 3/2012 | Koyama | G06F 8/65 717/168 |
| 2012/0079537 A1 * | 3/2012 | Kalidindi | H04N 21/2225 725/40 |
| 2012/0081506 A1 * | 4/2012 | Marvit | H04N 7/15 348/14.12 |
| 2012/0179678 A1 * | 7/2012 | Irie | G06F 17/30997 707/736 |
| 2012/0240236 A1 * | 9/2012 | Wyatt | G06F 21/564 726/25 |
| 2013/0019236 A1 * | 1/2013 | Nakagawa | G06F 8/65 717/170 |
| 2013/0159991 A1 * | 6/2013 | Sato | G06F 9/44505 717/173 |
| 2014/0201645 A1 * | 7/2014 | Mo | G06F 17/30058 715/738 |
| 2014/0282485 A1 * | 9/2014 | Nakamura | G06F 8/65 717/173 |
| 2014/0380299 A1 * | 12/2014 | Nakamura | G06F 8/65 717/173 |
| 2015/0339359 A1 * | 11/2015 | Takaoka | G06F 17/30563 707/602 |
| 2016/0124741 A1 * | 5/2016 | Hu | G06F 8/65 717/171 |
| 2016/0231996 A1 * | 8/2016 | Tamura | G06F 13/00 |
| 2016/0231997 A1 * | 8/2016 | Mihara | G06F 8/654 |
| 2016/0378454 A1 * | 12/2016 | Nekrestyanov | G06F 8/65 717/170 |
| 2017/0171360 A1 * | 6/2017 | Phillips | H04L 69/03 |
| 2017/0308373 A1 * | 10/2017 | Hu | H04L 67/34 |

FOREIGN PATENT DOCUMENTS

| | | |
|---|---|---|
| JP | 2001-147817 | 5/2001 |
| JP | 2006-119902 | 5/2006 |
| JP | 2006-203392 | 8/2006 |
| JP | 2010-198630 | 9/2010 |
| JP | 2011-076507 | 4/2011 |
| JP | 2011-248599 | 12/2011 |
| JP | 2012-084118 | 4/2012 |
| JP | 2013-020506 | 1/2013 |
| JP | 2014-179050 | 9/2014 |
| JP | 2015-005061 | 1/2015 |

OTHER PUBLICATIONS

Tukuljac et al., "A Service for Metadata Enrichment for Video on Demand Systems", IEEE, Jan. 2016, pp. 43-45; <https://ieeexplore.ieee.org/stamp/stamp.jsp?tp=&arnumber=7391299>.*

Mylonakis et al., "Metadata Management and Sharing in Multimedia Open Learning Environment (MOLE)", MTSR 2011, Oct. 2011, pp. 1-35; <https://www.researchgate.net/publication/226477243_Metadata_Management_and_Sharing_in_Multimedia_Open_Learning_Environment_MOLE>.*

Extended European Search Report dated Oct. 12, 2016 in Patent Application No. 14859934.3.

International Search Report dated Nov. 11, 2014 in PCT/JP2014/073705 filed on Sep. 8, 2014.

Written Opinion dated Nov. 11, 2014 in PCT/JP2014/073705 filed on Sep. 8, 2014.

* cited by examiner

FIG.6

```
{
  "version": "1.0.1",
  "dependency": "1.0.0",
  "description": "It is sample data.",
  "files": [
    {"src": "https://update.example.jp/1.0.1/NewFile.dll", "sha1sum": "3ab15e931dcd60e5acfeac271bd09d57641611b6"},
    {"src": "https://update.example.jp/1.0.1/NewFirm.exe", "sha1sum": "d296c72aaca0a168e319f5898fda3ee0e3e7d4c8"},
    {"src": "https://update.example.jp/1.0.1/update.dup", "sha1sum": "e709041747e02c181df37d8ddc0a6296b712aaf1"}
  ],
  "scriptname": "update.dup",
  "require_reboot": "true",
  "force_update": "true"
  "valid date": "201209151200"
  "data size": "1954262"
}
```

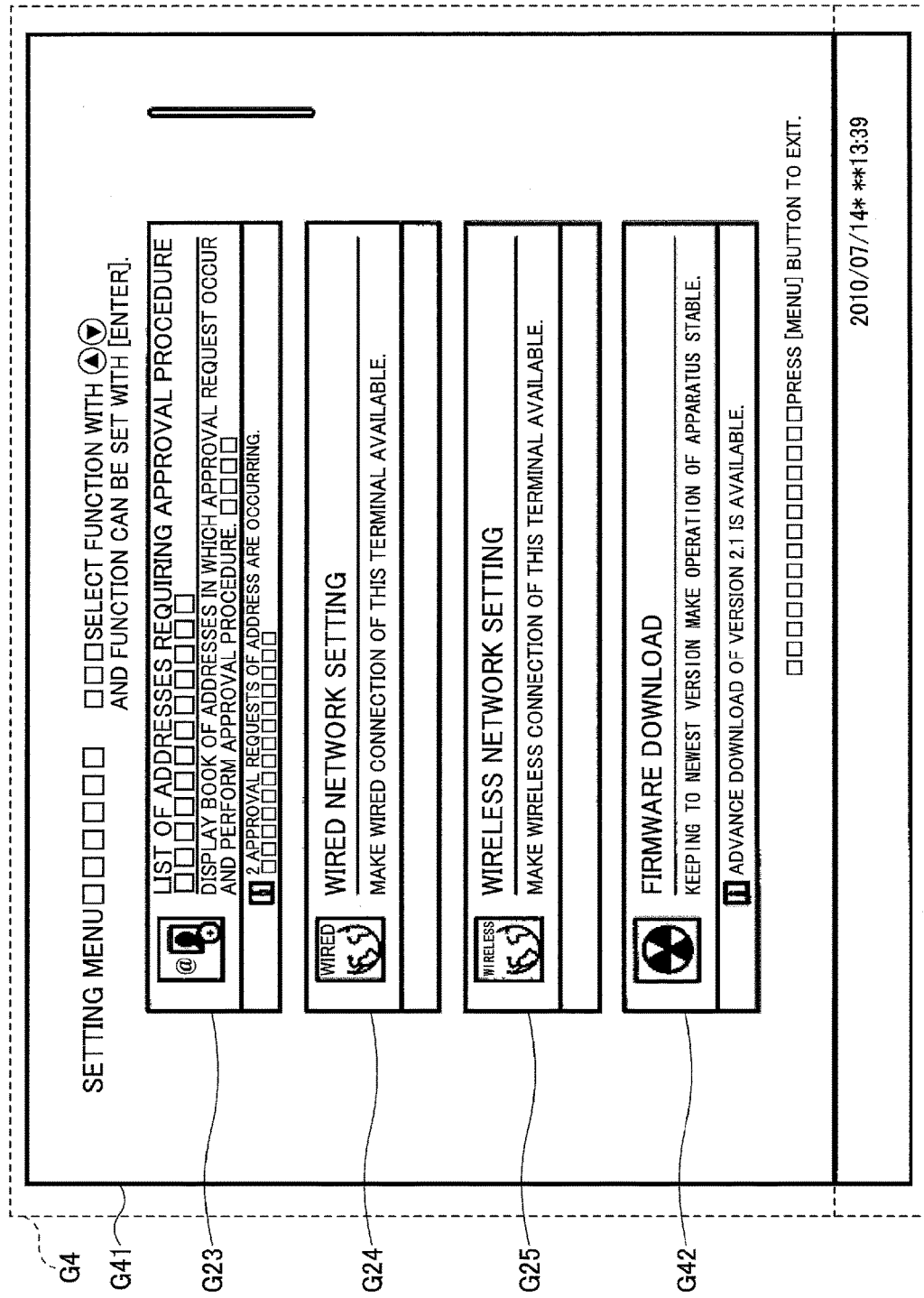

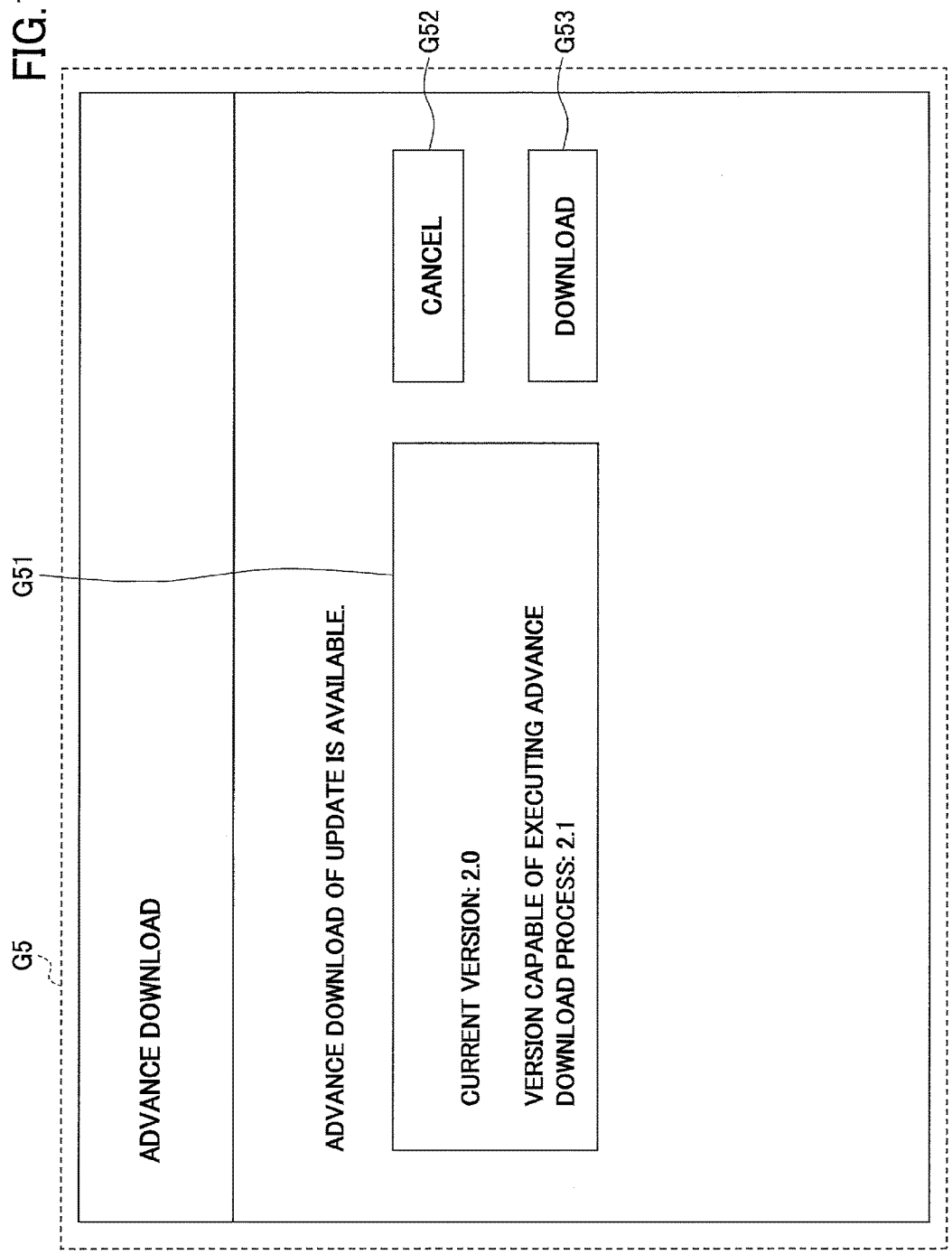

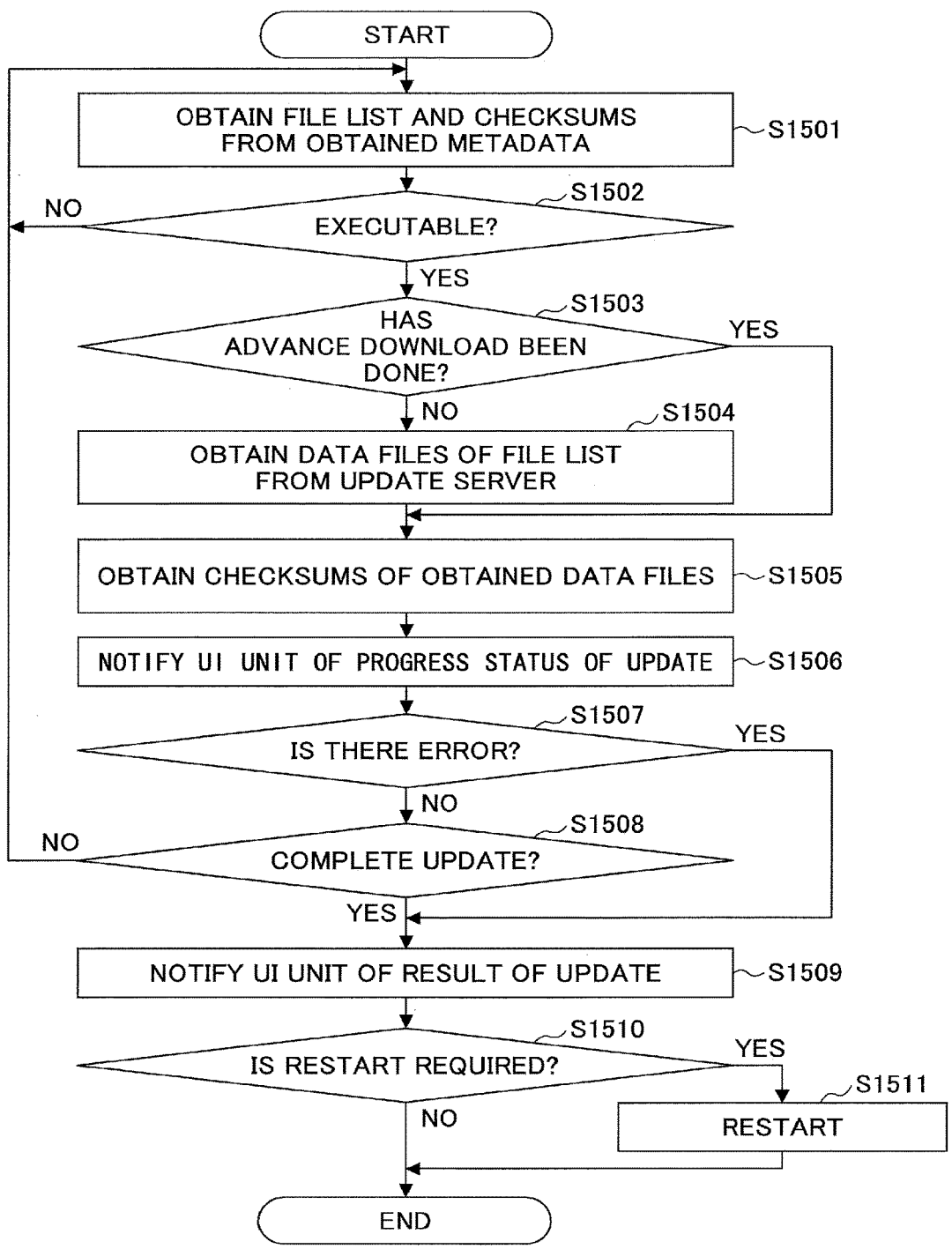

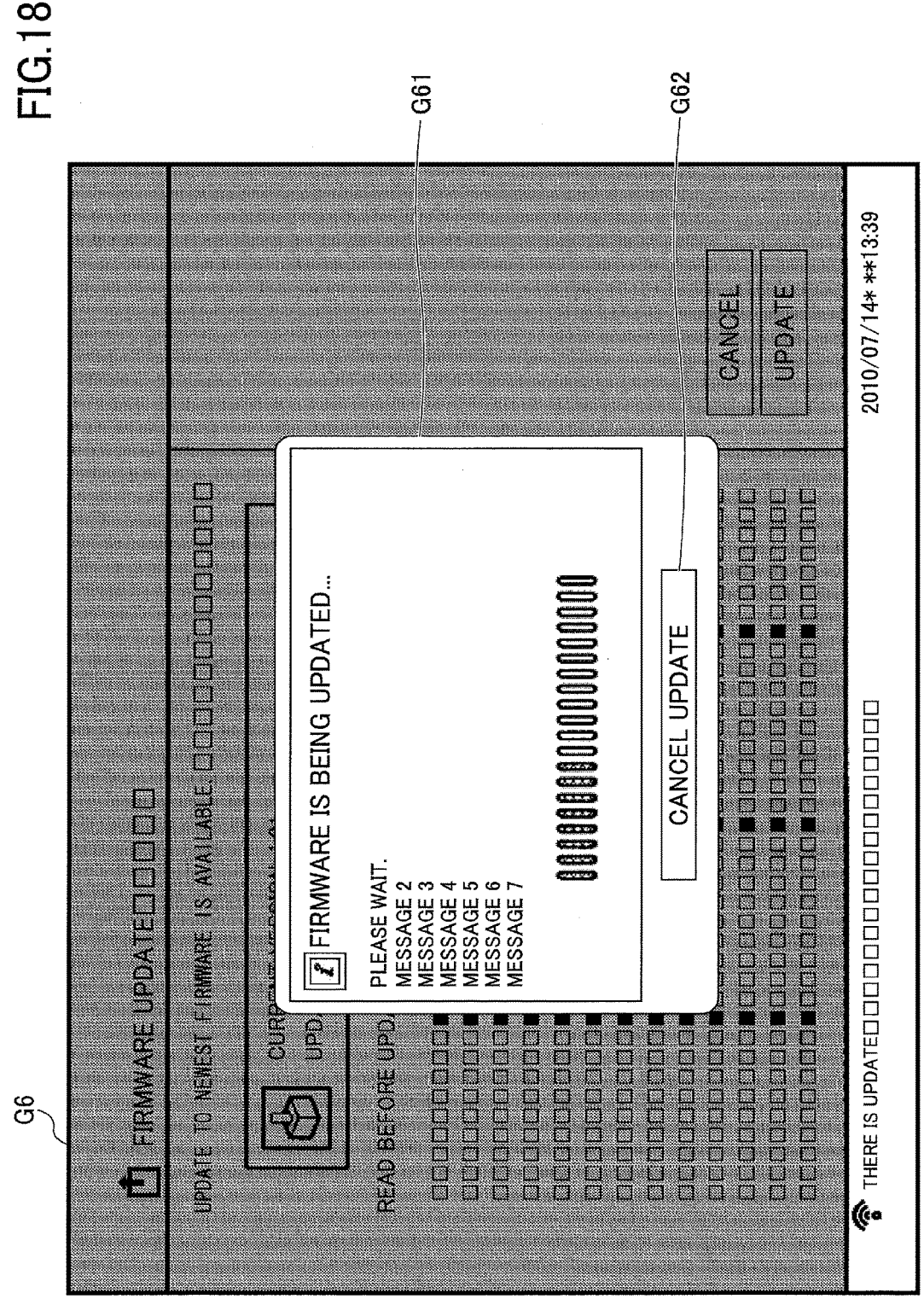

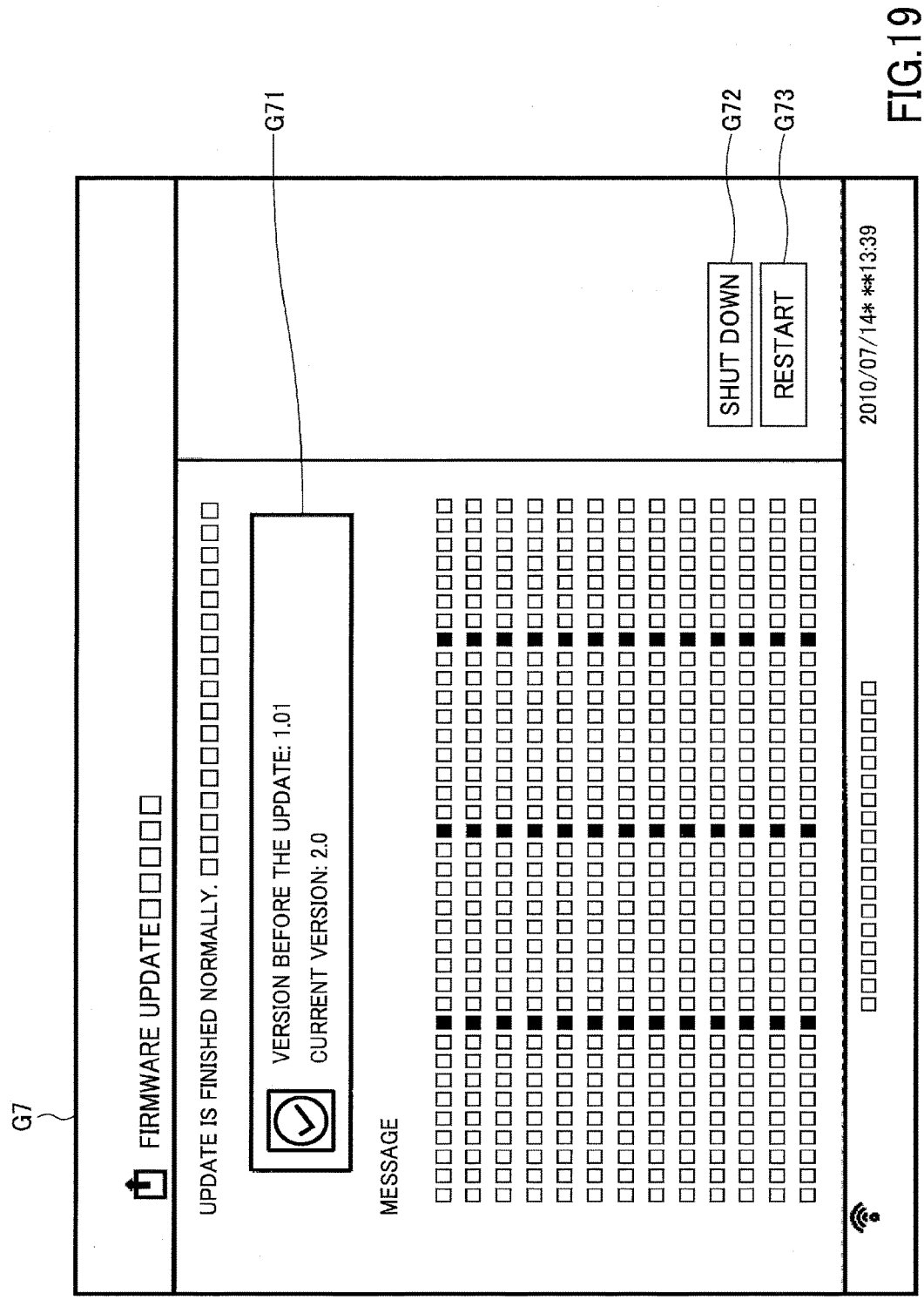

COMMUNICATION APPARATUS, COMMUNICATION SYSTEM, AND COMMUNICATION METHOD

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2014/073705 filed on Sep. 8, 2014, which is based upon and claims the benefit of priority of Japanese Priority Application No. 2013-229105 filed on Nov. 5, 2013, the entire contents of which are hereby incorporated by reference.

BACKGROUND OF THE INVENTION

1. Field of the Invention

The present invention relates to a communication apparatus, a communication system, and a communication method.

2. Description of the Related Art

A conference system which performs a remote conference with a remote location via a communication network such as the Internet is popularized. According to such a conference system, in a conference room in which one of concerned persons such as participants who perform the remote conference is present, a terminal apparatus is used for shooting images and collecting voice such as remarks in the conference room. Then, they are converted into digital data to be, transmitted to another terminal apparatus, displayed on a display in another conference room, and output by a speaker as voice to perform the conference between the remote locations in a state close to an actual conference.

In some communication systems such as the above described conference system, firmware (program) of the terminal apparatus is regularly updated in order to enhance confidentiality of calling and operability. Regarding a program in such a communication system, a method for updating the program by acquiring update data and meta-information (metadata) of the update data by accessing a server via a network is already known (refer to Patent Documents 1 and 2). By acquiring the update data after acquiring the meta-information in advance and determining necessity of the update, acquiring unnecessary update data can be omitted. It should be noted that download of update data becomes available normally on or after a date when the update can be started.

RELATED-ART DOCUMENTS

Patent Documents

[Patent Document 1] Japanese Unexamined Patent Application Publication No. 2012-084118
[Patent Document 2] Japanese Unexamined Patent Application Publication No. 2013-020506

As described above, the advance download is effective for preventing concentration of download request accesses and for advancing the update smoothly. However, when the video conference is started during the advance download, a bandwidth necessary for the video conference cannot be secured depending on a network environment of the user. Thus, there is a problem that quality of video/voice is degraded while the user is unconscious of it, and the video conference is disconnected in the worst case.

It is a general object of at least one embodiment of the present invention to provide a communication apparatus, a communication system, and a communication method that substantially obviate one or more problems caused by the limitations and disadvantages of the related art.

SUMMARY OF THE INVENTION

An embodiment of the present invention is configured to include a receiving unit that receives metadata of update data used for an update; a determination unit that determines, based on a description of the metadata, whether or not there is update data that is subject to advance download in which download of the update data is executed before a point of time at which the update is able to start; a control unit that determines whether or not it is timing to perform the advance download; and an update processing unit that downloads the update data in a case in which the determination unit determines that there is the update data that is subject to the advance download and the control unit determines that it is the timing to perform the advance download.

BRIEF DESCRIPTION OF THE DRAWINGS

FIG. 6 is a diagram illustrating an example of metadata;

FIG. 13 is a diagram illustrating an example of the setting screen;

FIG. 15 is a diagram illustrating an example of the confirmation screen;

FIG. 17 is a flowchart (part 3) illustrating a process example of the phone terminal;

FIG. 18 is a diagram illustrating an example of an update screen; and

FIG. 19 is a diagram illustrating an example of the confirmation screen.

DETAILED DESCRIPTION OF THE PREFERRED EMBODIMENTS

In the following, an embodiment of the present invention will be described.

<Configuration>

Figure 1:
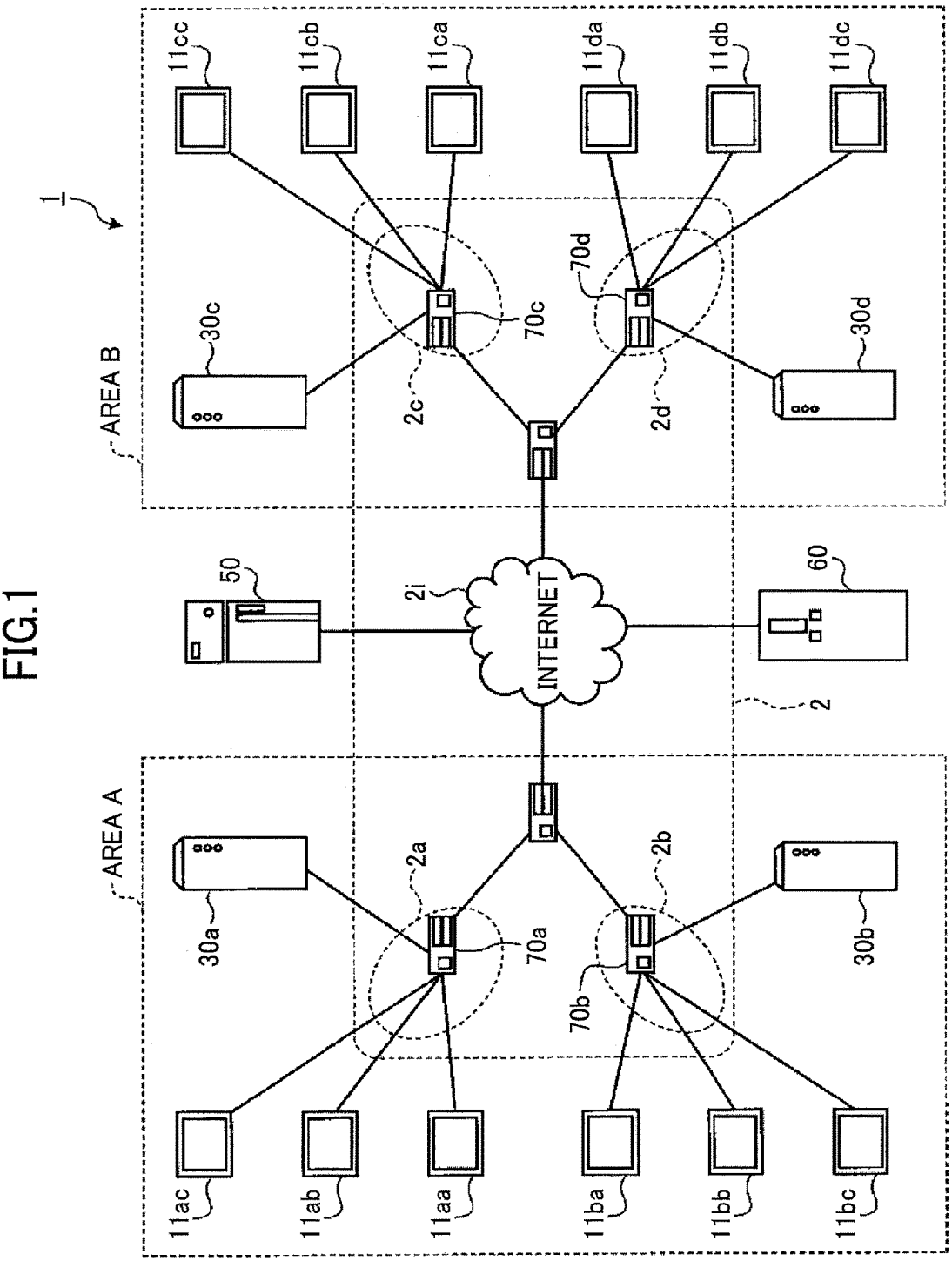
FIG. 1 is a diagram illustrating a configuration example of a communication system according to an embodiment of the present invention.

FIG. 1 is a diagram illustrating a configuration example of a communication system according to an embodiment of the present invention.

In FIG. 1, the communication system 1 is a system in which phone terminals 11aa to 11ac, 11ba to 11bc, 11ca to 11cc, and 11da to 11dc, which serve as communication apparatuses, a communication management server 50, an update server 60, and routers 70a to 70d are communicatively connected via a communication network 2. Specifically, the communication system 1 is a configuration including local area networks (LANs) 2a, 2b, 2c, and 2d, which are connected to the Internet 2i via the routers 70a to 70d, the communication management server 50, the update server 60 relay devices 30a, 30b, 30c, and 30d and the phone terminals 11aa to 11ac, 11ba to 11bc, 11ca to 11cc, and 11da to 11dc. The phone terminals 11aa to 11ac and the relay device 30a are connected to the LAN 2a. The phone terminals 11ba to 11bc and the relay device 30b are connected to the LAN 2b. The phone terminals 11ca to 11cc and the relay device 30c are connected to the LAN 2c. The phone terminals 11da to 11dc and the relay device 30d are connected to the LAN 2d. In the communication system 1, under management of the communication management server 50, the phone terminals 11aa to 11ac and 11ba to 11bc in an area A and the phone terminals 11ca to 11cc and 11da to 11dc in an area B make calls by transmitting and receiving data containing at least one of audio data and video (image) data to and from each other via relay of communication data according to the relay devices 30a, 30b, 30c, and 30d.

Specifically, the communication management server 50 manages information including communication addresses of the phone terminals 11aa to 11ac, 11ba to 11bc, 11ca to 11cc, and 11da to 11dc, the relay devices 30a, 30b, 30c, and 30d, and the like, information about phone terminals to be relayed by each of the relay devices 30a, 30b, 30c, and 30d, and call state of the each of phone terminals. For example, when a call is to be made from the phone terminal 11aa to the phone terminal 11ca, the communication management server 50 requests the relay device 30a to relay the call to the phone terminal 11ca. The relay device 30a notifies the communication management server 50 of a start of the call from the phone terminal 11aa, and obtains the communication address of the relay device 30c from the communication management server 50 to relay the call to the phone terminal 11ca. Then, the relay device 30a requests the relay device 30c to relay the call to the phone terminal 11ca, and the relay device 30c starts a communication session with the phone terminal 11ca. Then, the relay device 30c notifies the communication management server 50 of a start of the communication session with the phone terminal 11ca.

In this way, the call between the phone terminal 11aa and the phone terminal 11ca via the relay devices 30a and 30c has started. The communication management server 50 manages call states, which are "on call", of the phone terminal 11aa and the phone terminal 11ca. For example, in a case in which the communication management server 50 receives an inquiry about a call state of the phone terminal 11aa or the phone terminal 11ca from the phone terminal 11ab, the communication management server 50 returns a response that the phone terminal 11aa or the phone terminal 11ca is "on-line" but "on call".

It should be noted that, in the following descriptions, when an arbitrary apparatus of the same type apparatuses is described, a symbol, in which alphanumeric character following a numeral is omitted, is used. For example, each of the phone terminals 11aa to 11ac, 11ba to 11bc, 11ca to 11cc, and 11da to 11dc will be referred to generally as the "phone terminal 11". Further, each of the relay devices 30a to 30d will be referred to generally as the "relay device 30".

The update server 60 is an update data providing apparatus (second communication apparatus) that manages information related to updates of programs and various kinds of setting information of the phone terminals (first communication apparatuses) 11, and provides the information related to the updates in response to a request from the phone terminal 11. Related information, which indicates the information related to the updates, may be data files of every version, from past to the newest version, of the programs and the various kinds of setting information of the phone terminal 11, and metadata (meta-information) that describe contents of the updates for each of the versions. Because timing when an update is applied to the phone terminal 11 varies from one to another among the phone terminals 11, the update server 60 manages every version of the data files as the information related to updates.

For example, although the phone terminal 11 which is frequently updated may need an update only to the newest version, the phone terminal 11 after a long update interval may be updated to one or more versions before being updated to the newest version. In such a case, the phone terminal 11 may be updated to an old version having a dependence relationship with the newest version without being updated to the newest version directly. In this way, because some of the phone terminals 11 may be updated to the old version having the dependence relationship with the newest version, the update server 60 manages data of every version as the information related to the updates.

Here, updates can be classified into two types: normal updates and forced updates. The normal update is an update to be applied to cope with an error such as a bug and to add a function.

The forced update is an update to be forcibly applied to in accordance with a change made to another device rather than the phone terminal 11 or another function rather than functions of the phone terminal 11. For example, there may be a case in which a format of audio data or image data, which is to be transferred during calls, or a video codec is changed in the relay device 30, or a case in which version-up related to video, such as an update of an encoder, is applied to the relay device 30. Further, there may be a case in which a communication protocol with the relay device 30 is changed. Because such a change changes a structure of audio, image, or video data, changes a communication procedure with the relay device 30 in accordance with the change in the communication protocol, or changes functions of the relay device 30, the phone terminal 11 before the update is incapable of making a call which is a primary function of the phone terminal 11. Accordingly, in such a case, a forced update is applied to the phone terminal 11 to adapt to the version of the updated relay device 30.

In a case in which a problem in terms of security, such as a security hole, is found in the relay device 30, an update to avoid the problem, such as an update to cope with the security hole, may be applied to the relay device 30. Also in such a case, because the phone terminal 11 is unusable even in making a call until the phone terminal 11 is updated, forced update is applied in order to cope with the security hole of the relay apparatus 30 side.

Figure 2:
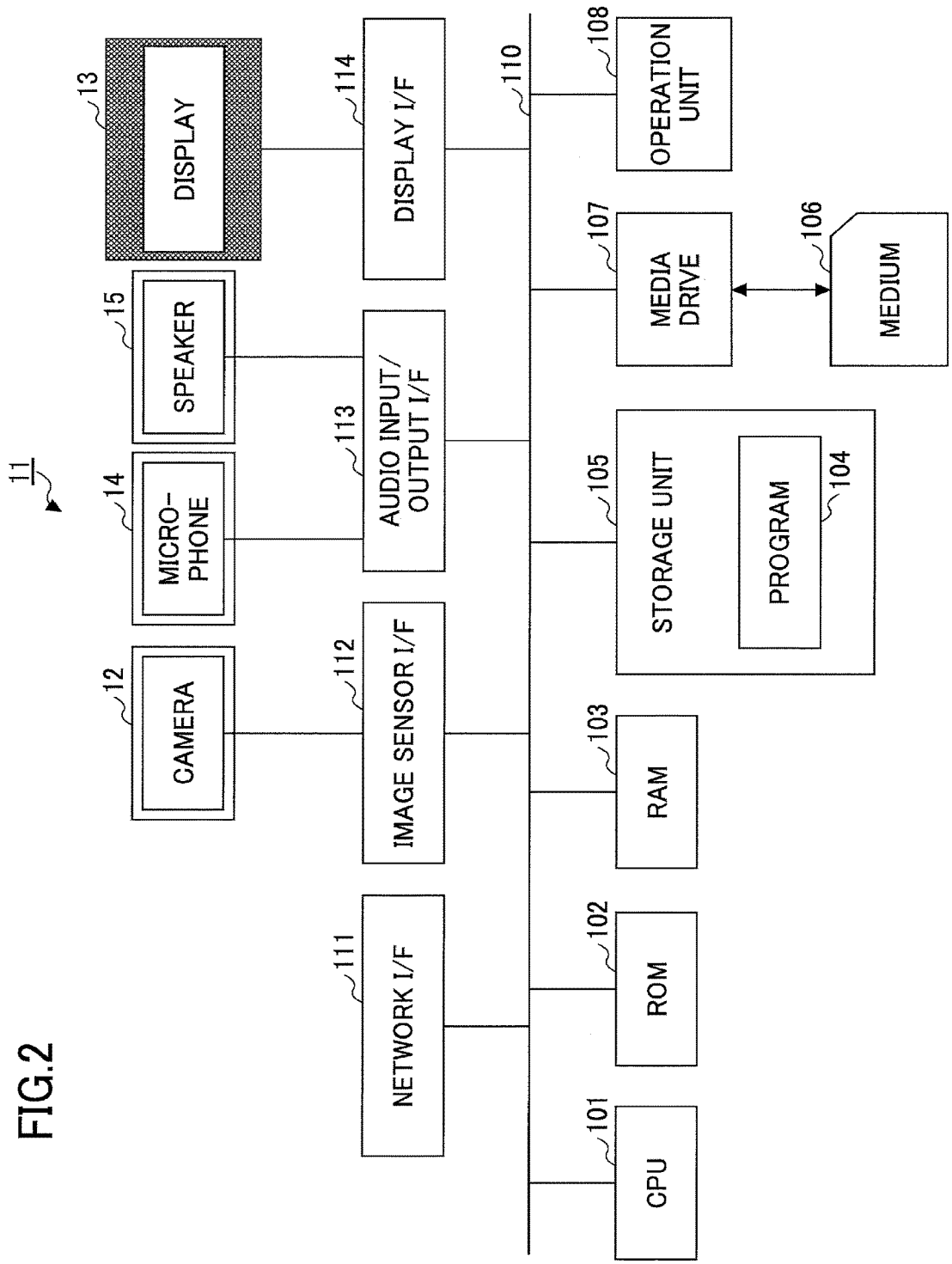
FIG. 2 is a diagram illustrating an example of a hardware configuration of a phone terminal.

FIG. 2 is a diagram illustrating an example of a hardware configuration of the phone terminal.

In FIG. 2, the phone terminal 11 includes a configuration in which a central processing unit (CPU) 101, a read only memory (ROM) 102, a random access memory (RAM) 103, a storage unit 105, a media drive 107, an operation unit 108, a network interface (I/F) 111, an image sensor I/F 112, an audio input/output I/F 113, and a display I/F 114 are connected to each other via a bus 110.

The CPU 101 performs central control of operation of the phone terminal 11 by loading a program 104 stored in the ROM 102 or the storage unit 105 into the RAM 103 and sequentially executing the program 104. The storage unit 105, which can be a hard disk drive (HDD) or a solid state drive (SSD), stores data in a readable and writable manner. Specifically, the storage unit 105 stores the program 104 to be executed by the CPU 101 and various kinds of setting information. When the phone terminal 11 is updated, the program 104 and the various kinds of setting information stored in the storage unit 105 are updated.

The media drive 107 is a drive device which reads and writes data from and to a medium 106 such as an optical disk. The operation unit 108 may be a keyboard, various operation keys, and a touch panel arranged on a display 13 in a layered manner and receives operations input by a user. The network I/F 111 is an interface connected to the communication network 2 for data communication. The image sensor I/F 112 is an interface connected to a camera 12, which is a digital camera, for obtaining an image captured by the camera 12. The audio input/output I/F 113 is an interface connected to a microphone 14 and a speaker 15 so that audio can be input from the microphone 14 and audio can be output via the speaker 15. The display I/F 114 is an interface connected to the display 13, which can be a liquid crystal display (LCD) or the like, and outputs display data to the display 13. It should be noted that although the display 13 is used in the embodiment, another configuration may be employed in which another display device, such as a projector, is connected instead of the display 13.

Under control of the CPU 101 executing the program 104, the phone terminal 11 outputs, to the relay device 30, an image acquired from the camera 12 and audio input from the microphone 14 through the network I/F 111 during a call session with another phone terminal 11, for example. Further, the phone terminal 11 outputs audio, which is input from the other phone terminal 11 and relayed by the relay device 30 through the network I/F 111, from the speaker 15. Similarly, the phone terminal 11 displays an image from the other phone terminal 11 on the display 13. In this way, the phone terminal 11 realizes an audio/image call, which is a so-called TV conference, with the other phone terminal 11. It should be noted that the phone terminal 11 may be a communication terminal such as a general-purpose personal computer (PC), a smartphone, a mobile phone, or a tablet PC.

Figure 3:
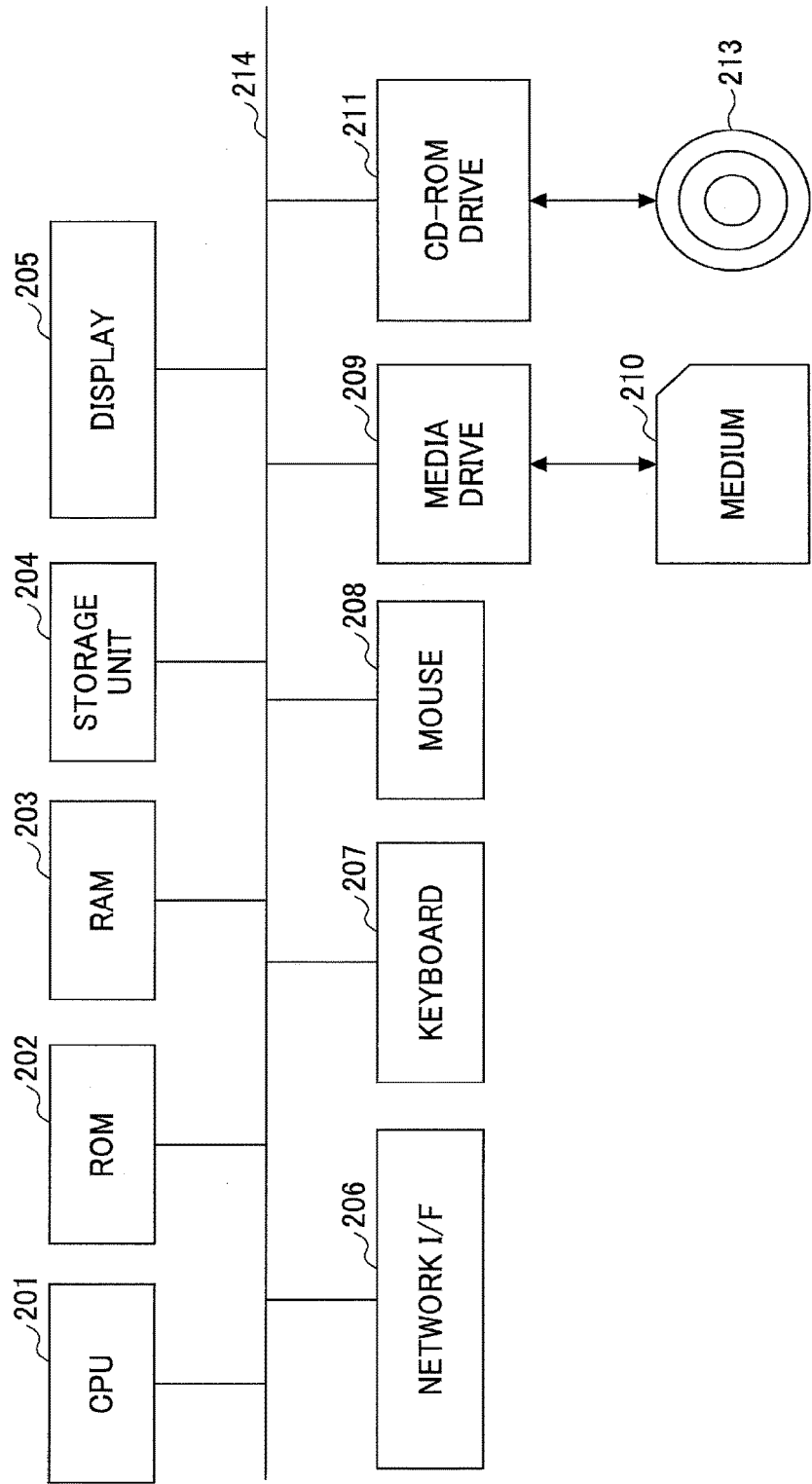
FIG. 3 is a diagram illustrating an example hardware configuration of a relay device, a communication management server, and an update server.

FIG. 3 is a diagram illustrating an example hardware configuration of the relay device, the communication management server, and the update server.

In FIG. 3, each of the relay device 30, the communication management server 50, and the update server 60 is a configuration in which a CPU 201, a ROM 202, a RAM 203, a storage unit 204, a display 205, a network I/F 206, a keyboard 207, a mouse 208, a media drive 209, and a compact disk read-only memory (CD-ROM) drive 211 are connected to each other via a bus 214. Each of the relay device 30, the communication management server 50, and the update server 60 may be an apparatus such as a personal computer (PC) and a workstation.

The CPU 201 performs central control of operation of the apparatus illustrated in FIG. 3 by loading a program stored in the ROM 202 or the storage unit 204 into the RAM 203 and sequentially executing the program. The storage unit 204, which can be an HDD or an SSD, stores data in a readable and writable manner. For example, in the update server 60, information related to updates and the like are stored in the storage unit 204.

The display 205 may be a LCD, for example. The network I/F 206 is an interface connected to the communication network 2 for data communication. The keyboard 207 and the mouse 208 receive operations input by a user. The media drive 209 is a drive device that reads and writes data from and to a medium 210 such as an optical disk. The CD-ROM drive 211 is a drive device which performs reading from a CD-ROM 213. For example, in the update server 60, latest information related to updates may be provided by the medium 210 or the CD-ROM 213 and stored in the storage unit 204.

Figure 4:
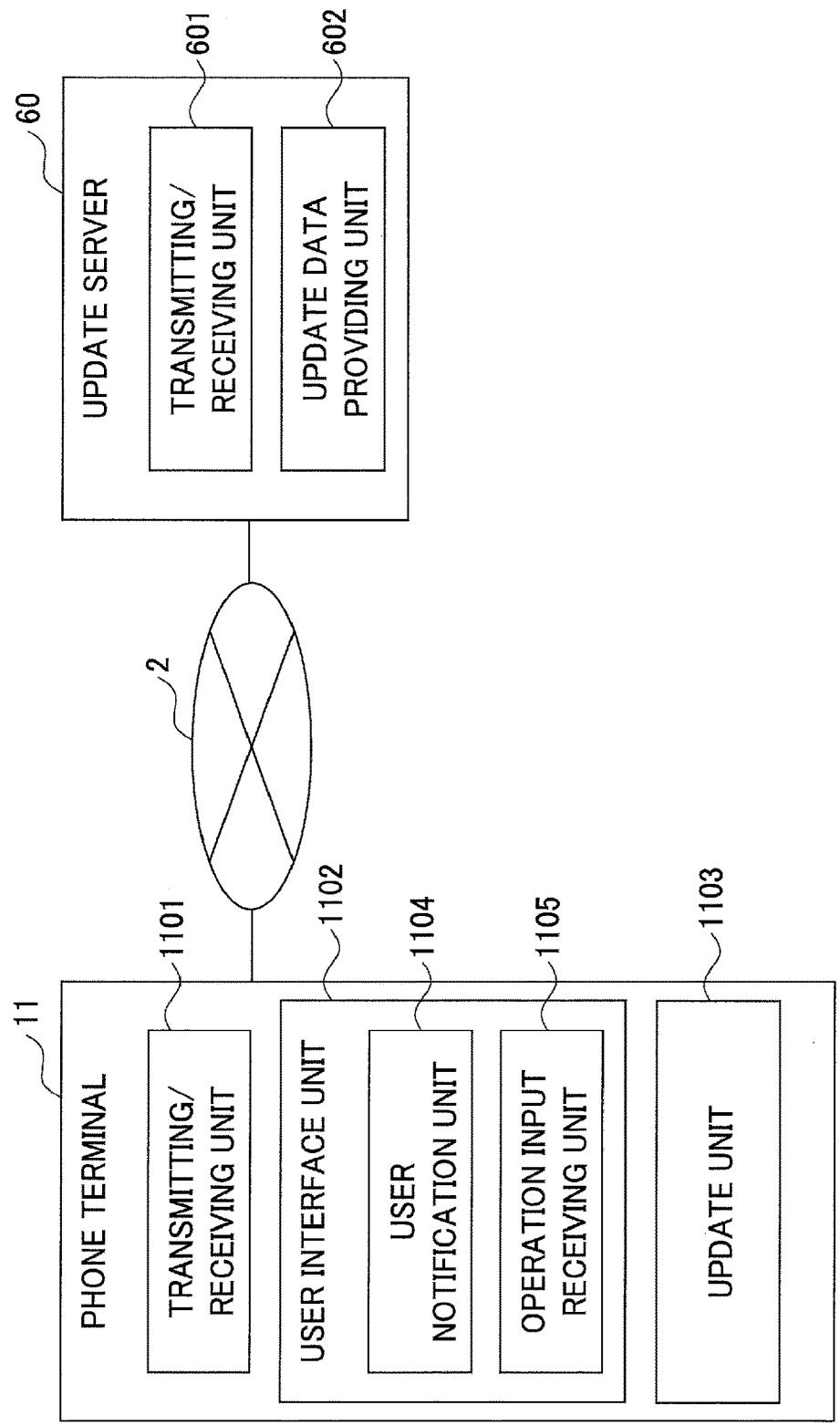
FIG. 4 is a diagram illustrating examples of functional configurations of the phone terminal and the update server.

FIG. 4 is a diagram illustrating examples of functional configurations of the phone terminal and the update server. These functions are implemented by, mainly, the CPU 101 and the CPU 201 executing programs.

In FIG. 4, the phone terminal 11 primarily includes a transmitting/receiving unit 1101, a user interface unit 1102, and an update unit 1103. The update server 60 primarily includes a transmitting/receiving unit 601 and an update data providing unit 602. A part or all of each of the functions of the phone terminal 11 and the update server 60 may be configured in hardware.

The transmitting/receiving unit 1101 of the phone terminal 11 transmits and receives data to and from the update server 60 via the communication network 2. Specifically, the transmitting/receiving unit 1101 transmits and receives data to and from the update server 60 by starting a communication session using a predetermined communication protocol based on the communication address of the update server 60. The communication address may be set in the setting information stored in the storage unit 105 in advance or, obtained by making an inquiry to the communication management server 50. By carrying out data transmission/reception in this manner, the transmitting/receiving unit 1101 obtains information (metadata and update data, for example) related to updates managed by the update server 60.

The user interface unit 1102 is an interface that controls information transmission between a user and the phone terminal 11 by controlling audio output from the speaker 15, a display screen on the display 13, and acceptance of an operation input by the operation unit 108 from the user. Specifically, the user interface unit 1102 includes a user notification unit 1104, which reports notification of various types to a user by using audio output from the speaker 15 and a display screen on the display 13, and an operation input receiving unit 1105, which receives an operation input by the operation unit 108 from the user.

The update unit 1103, which serves as a determination unit and an update processing unit, controls and performs updates (including download of update data) of the program 104 and various kinds of setting information stored in the storage unit 105 of the phone terminal 11 based on information that indicates information related to updates obtained by the transmitting/receiving unit 1101 from the update server 60.

The transmitting/receiving unit 601 of the update server 60 transmits and receives data to and from the phone terminal 11 via the communication network 2. Specifically, the transmitting/receiving unit 601 transmits and receives data to and from the update server 60 by starting a communication session using a predetermined communication protocol via the communication network 2 according to a request from the phone terminal 11.

The update data providing unit 602 provides information related to updates managed by the update server 60 to the phone terminal 11 according to a request from the phone terminal 11, in which the transmitting/receiving unit 601 is transmitting and receiving data.

<Operation>

Figure 5:
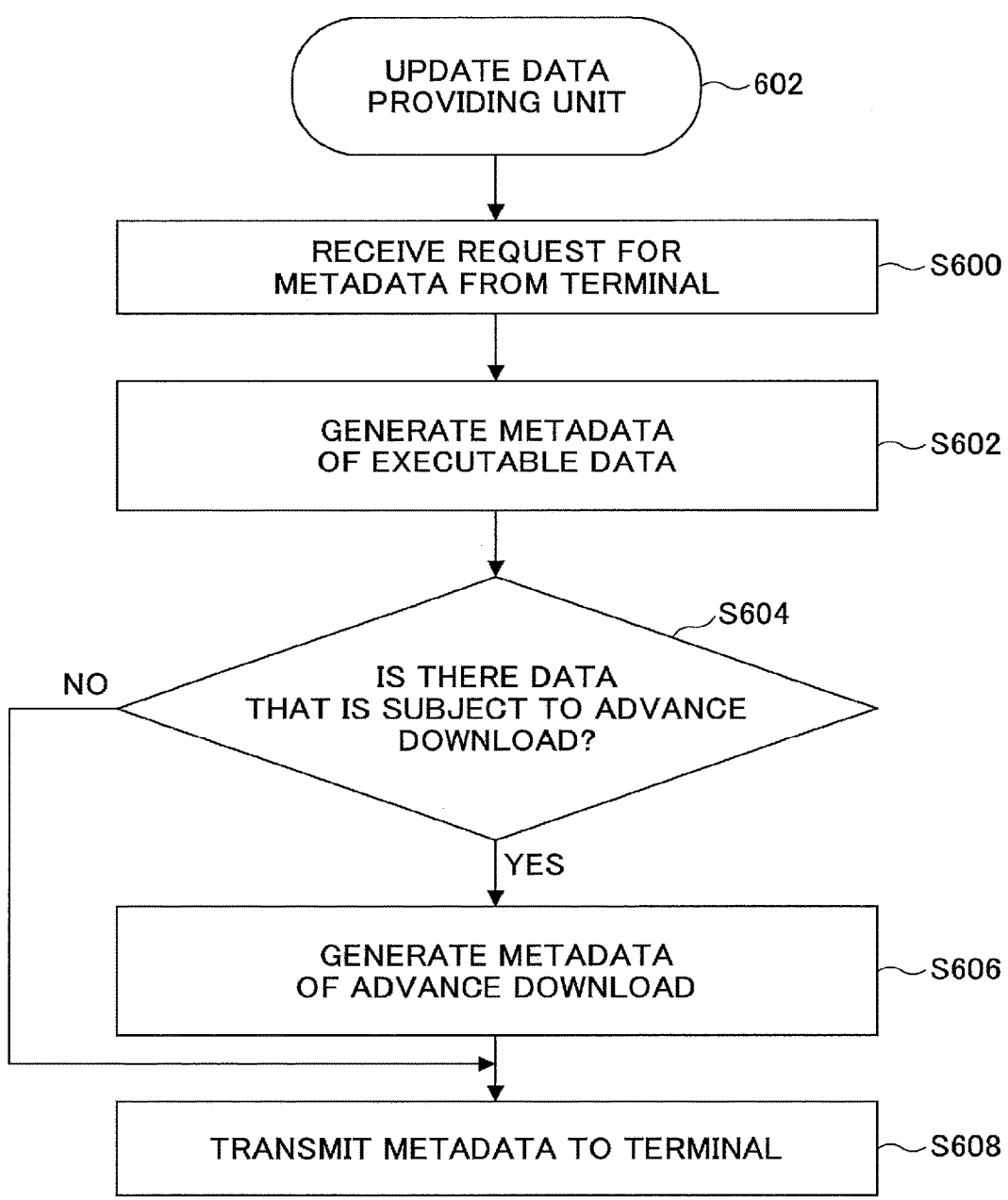
FIG. 5 is a flowchart illustrating an example of a process of an update data providing unit of the update server.

FIG. 5 is a flowchart illustrating an example of a process of the update data providing unit 602 of the update server 60.

In FIG. 5, the update data providing unit 602 receives a request for metadata from the phone terminal 11 (Step S600).

When receiving the request for metadata, the update data providing unit 602 generates metadata of data (executable data) in which the update is currently executable (Step S602).

The update data providing unit 602 further determines whether or not there is data that is subject to advance download (Step S604). Here, the data that is subject to the advance download is update data, an update with which is currently not executable but which is downloadable in advance relative to a date when the update becomes available (earlier than a date when the update becomes available). That is, the data that is subject to the advance download is update data that is downloadable before an update of the application that executes the video conference is performed, for example. The advance download allows preventing concentration of accesses to the update server 60 when the update is executed.

The update data providing unit 602 determines whether or not there is update data which is downloadable in advance depending on whether or not time of "valid date" contained in metadata, which will be described later, is later than the current time. The update data providing unit 602 may obtain the current time from, for example, a network time protocol (NTP) server or, from an internal clock.

In a case in which the update data providing unit 602 determines that there is update data, which is downloadable in advance (YES in Step S604), the update data providing unit 602 generates metadata of the update data that is subject to the advance download (Step S606). Then, the update data providing unit 602 transmits the metadata of the data update with which is currently executable and the metadata of the update data that is subject to the advance download to the phone terminal 11 (Step S608).

Further, in a case in which the update data providing unit 602 determines that there is no update data that is downloadable in advance (NO in Step S604), the update data providing unit 602 transmits only the metadata of the data update with which is currently executable to the phone terminal 11 (Step S608).

FIG. 6 is a diagram illustrating an example of metadata.

In FIG. 6, each version of the metadata is a configuration including data items such as "version", "dependency", "description", "files", "scriptname", "require_reboot", "force_update", "valid date", and "data size".

A version number, e.g., "1.0.1", is described in the "version". A version number, e.g., "1.0.0", that indicates another version having the dependence relationship with each other version is described in the "dependency". Accordingly, a version(s) with which the dependence relationship is present can be traced back by confirming the version number(s) described in the "dependency" of the data item. A detail of the version, e.g., "It is sample data.", is described in the "description". A list of programs (data files) that becomes entities of updates, locations of the data files, and checksums of the data files managed by the update server 60, and the like are described in the "files". Accordingly, the update unit 1103 can execute an update relating to the version described by the metadata by the transmitting/receiving unit 1101 acquiring a data file(s) based on described contents of the "files" of the data item. A name of a script to be executed when executing the update is described in the "scriptname". A flag ("true" or "false") which indicates whether or not to restart the phone terminal 11 after the update is executed is described in the "require_reboot". A flag ("true" or "false") indicating whether or not the update is forced update is described in the "force_update". Date and time when update data becomes executable are described in the "valid date". That is, the "valid date" is information which allows determining whether or not the update data is the advance download data. Size of the update data is described in the "data size".

Some update of the program 104 is associated with device control such as the network I/F 111, the image sensor I/F 112, the audio input/output I/F 113, and the display I/F 114. "True" is described in the "require_reboot" because such an update of the device control requires a restart after the update. As described above, updates of the program 104 are classified into normal updates and forced updates. "True" is described in the "force_update" when a forced update is performed.

Figure 7:
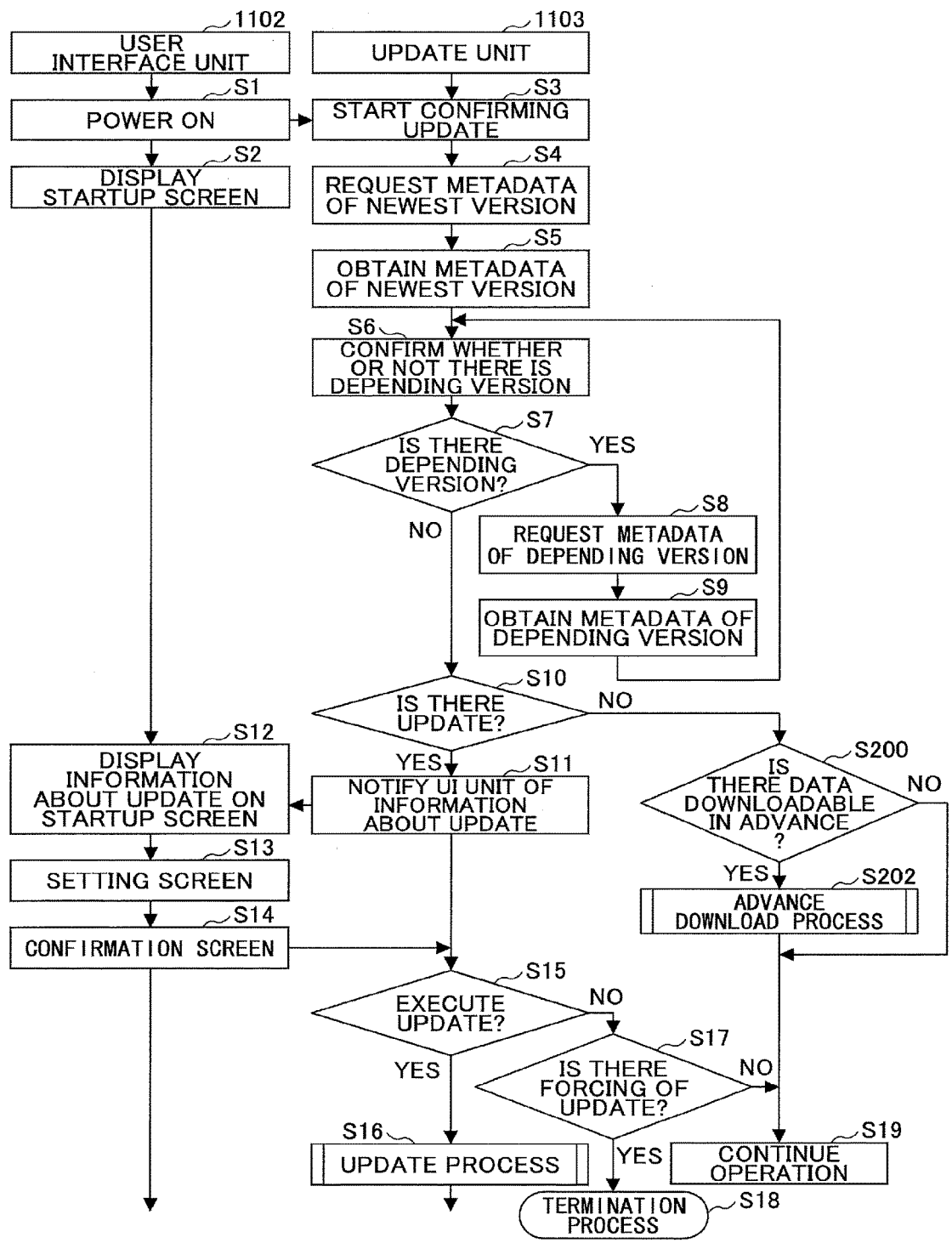
FIG. 7 is a flowchart (part 1) illustrating a process example of the phone terminal.

FIG. 7 is a flowchart illustrating a process example of the phone terminal.

In FIG. 7, the user interface unit 1102 turns on power (power on) of the phone terminal 11 in response to an operation of a power switch of the operation unit 108 or the like (Step S1), and displays a startup screen on the display 13 (Step S2). The startup screen is a display screen on which a list of call states of the respective phone terminals 11 is displayed. The call states are obtained by making an inquiry to the communication management server 50 under control of the CPU 101 (which will be described in detail below).

The update unit 1103 starts confirming an update of the phone terminal 11 when being started after powered on in Step S1 (Step S3). It should be noted that in the following description, an example in which a program is updated is described. However, as a matter of course, the various kinds of setting information may be updated in a similar manner.

When the confirmation of the updates is started, the update unit 1103 causes the transmitting/receiving unit 1101 to make a request to the update server 60 for metadata of the program of the newest version (Step S4). In response to the request, the update unit 1103 obtains the metadata which is provided by the update data providing unit 602 of the update server 60 (Step S5).

Subsequently, the update unit 1103 confirms whether or not there is a depending version based on contents described in the data item "dependency" of the obtained metadata (Step S6). For example, as shown in FIG. 6, in a case in which a version number, e.g., "1.0.0", indicating another version is described in the data item "dependency", it is determined that there is a depending version. Further, in a case in which nothing is described in the data item "dependency", it is determined that there is no depending version.

Subsequently, the update unit 1103 determines whether or not there is a depending version after the confirmation in Step S6 (Step S7). In a case in which there is a depending version (YES in Step S7), the update unit 1103 causes the transmitting/receiving unit 1101 to make a request to the update server 60 for metadata of the program of the depending version (Step S8). In response to the request, the update unit 1103 obtains the metadata of the depending version provided by the update data providing unit 602 of the update server 60 (Step S9), and causes processing to return to Step S6. Thus, the update unit 1103 traces versions that depend on the newest version sequentially and obtains metadata related to these versions.

Subsequently, the update unit 1103 determines whether or not there is an update executable in the phone terminal 11 by comparing a version number described in the "version" of metadata of the newest version whose "Valid date" has been set before the current time with a version number of the program 104 stored in the storage unit 105 of the phone terminal 11 (Step S10). Specifically, in a case in which the version number of the newest version matches the version number of the program 104, it is determined that there is no executable update because the program 104 is the newest version.

Further, in a case in which the version number of the newest version does not match the version number of the program 104, it is determined that there is an executable update because the program 104 is an old version.

In a case in which there is an update executable in the phone terminal 11 (YES in Step S10), the update unit 1103 notifies the user interface unit 1102 of information about the update (Step S11). Specifically, the update unit 1103 notifies the user interface unit 1102 of the data items, such as the "files" and the "scriptname", of the metadata of the newest version and the versions that depend on the newest version as the information about the update except for data items that are unnecessary notification to the user.

The user notification unit 1104 of the user interface unit 1102 shows, on the startup screen of the display 13, that there is an update necessary for the phone terminal 11 based on the information about the update reported from the update unit 1103 in Step S11 to notify the user (Step S12).

Figure 8:
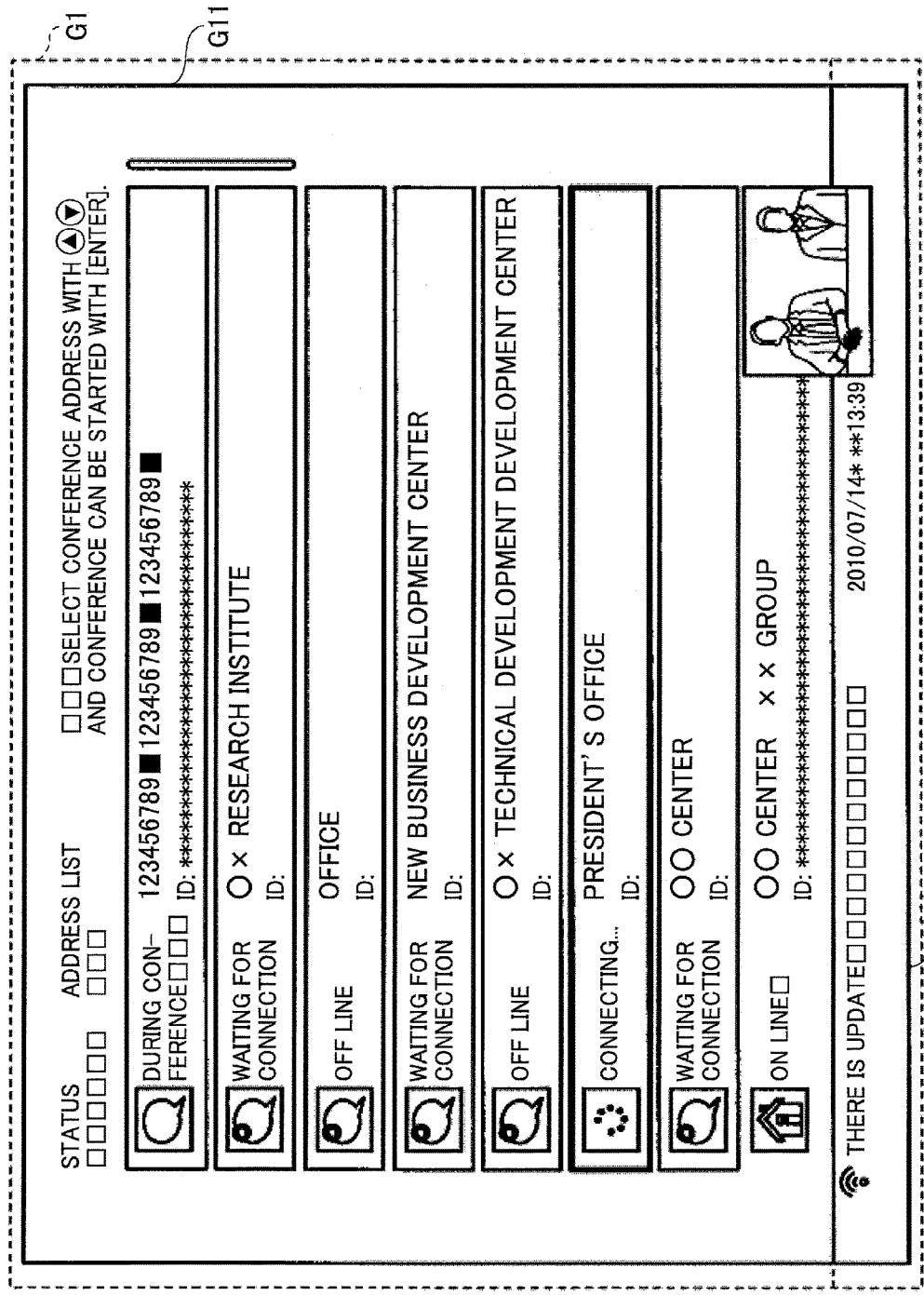
FIG. 8 is a diagram illustrating an example of a startup screen.

Here, the startup screen will be described in detail below. FIG. 8 is a conceptual diagram illustrating an example of a startup screen G1. In FIG. 8, the startup screen G1 is a configuration containing a main screen G11 where a list of call states of respective phone terminals is displayed and a status screen G12 where a status of the phone terminal 11 is displayed. When information about an update is reported from the update unit 1103, the user notification unit 1104 notifies a user by showing that there is the update on the status screen G12. The display of there being an update is not limited to the illustrated layout. A preset icon image may be displayed on the main window G11. It should be noted that in the illustrated example screens (FIGS. 8 through 11 and the like), parts expressed by outlined rectangles or black rectangles indicate areas, e.g., message display areas previously reserved on the system, where messages can be displayed.

Further, in a case in which a description of the "force_update" is "true" among the data items included as the information about the update, the user notification unit 1104 shows, on the startup screen G1, that the update data present in the phone terminal 11 is a forced update and notifies the user. Specifically, the user notification unit 1104 may show that an update is a forced update on the status screen G12 or, may make the list displayed on the main screen G11 a grayed-out state to report that any other operation than the update is disabled.

Referring back to FIG. 7, in a case in which an operation instruction for performing various settings such as an update is received by the operation input receiving unit 1105 of the user interface unit 1102 according to the notification to the user in Step S12, the user interface unit 1102 displays the setting screen on the display 13 (Step S13).

Figure 9:
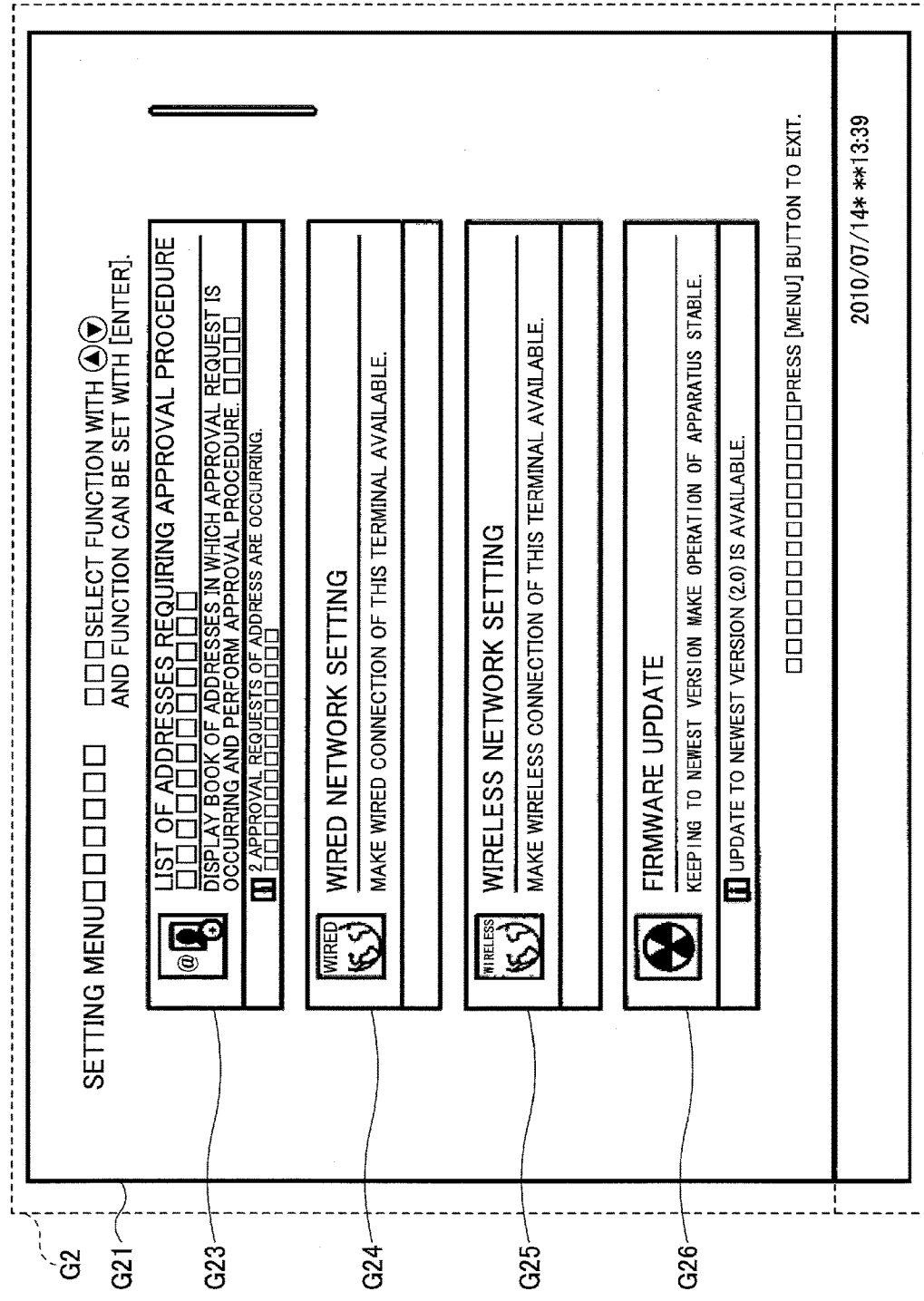
FIG. 9 is a diagram illustrating an example of a setting screen.

FIG. 9 is a conceptual diagram illustrating an example of the setting screen G2. As shown in FIG. 9, the setting screen G2 is a configuration containing the main screen G21 where the setting buttons G23 to G26 that receive selection operations of the user by the operation input receiving unit 1105 in order to perform various settings are displayed. The setting button G26, among the setting buttons G23 to G26, is a button for instructing execution of an update. In a case in which information about an update is not reported from the update unit 1103 and there is no update in the phone terminal 11, a selection operation of the setting button G26 is disabled by making the setting button G26 a grayed-out state. On the other hand, in a case in which information about an update is reported from the update unit 1103 and there is an update in the phone terminal 11, the grayed-out state is canceled and the button G26 becomes a state in which the selection operation of the user by the operation input receiving unit 1105 is to be received. In this case, a version number of the newest version, update to which is to be performed, and the like may be written in the setting button G26 based on the data item "version" contained in the information about the update. In the illustrated example, updating to the newest version whose version number is 2.0 is written. It should be noted that the setting screen G2 may further display a status screen where a status of the phone terminal 11 is displayed.

Referring back to FIG. 7, in a case in which the selection operation of the setting button G26 is operated in the setting screen (Step S13), the user interface unit 1102 displays, on the display 13, a confirmation screen in which execution of the update is confirmed (Step S14).

Figure 10:
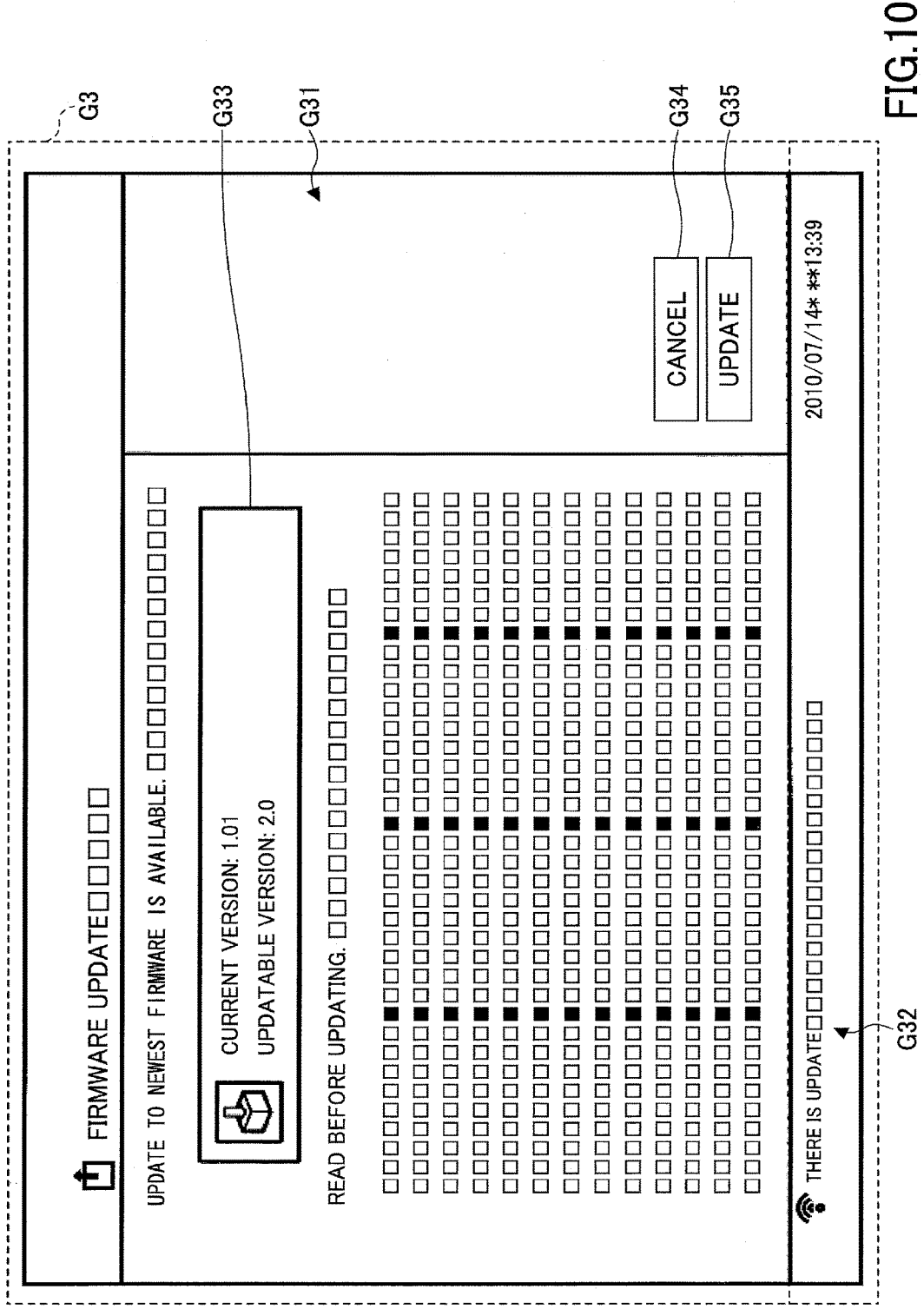
FIG. 10 is a diagram illustrating an example of a confirmation screen.

FIG. 10 is a conceptual diagram illustrating an example of a confirmation screen G3. As illustrated in FIG. 10, the confirmation screen G3 is a configuration containing a main screen G31, which contains an update display G33 in which contents of the update to be executed are displayed and operation buttons G34 and G35 for receiving the execution of the update with the contents or receiving instruction of the cancel from the user, and a status screen G32 in which a status of the phone terminal 11 is displayed. In addition to a current version, which is the version number of the program 104 of the phone terminal 11, information such as a version number of the newest version, update to which is to be performed, based on the data item "version" contained in the information about the update is displayed on the update display G33 to notify the user. Accordingly, based on the display contents of the update display G33, the user can confirm the version number to which the update is to be performed. It should be noted that the update display G33 on the confirmation screen G3 may be configured to further display information as to whether or not a restart is to be performed.

Figure 11:
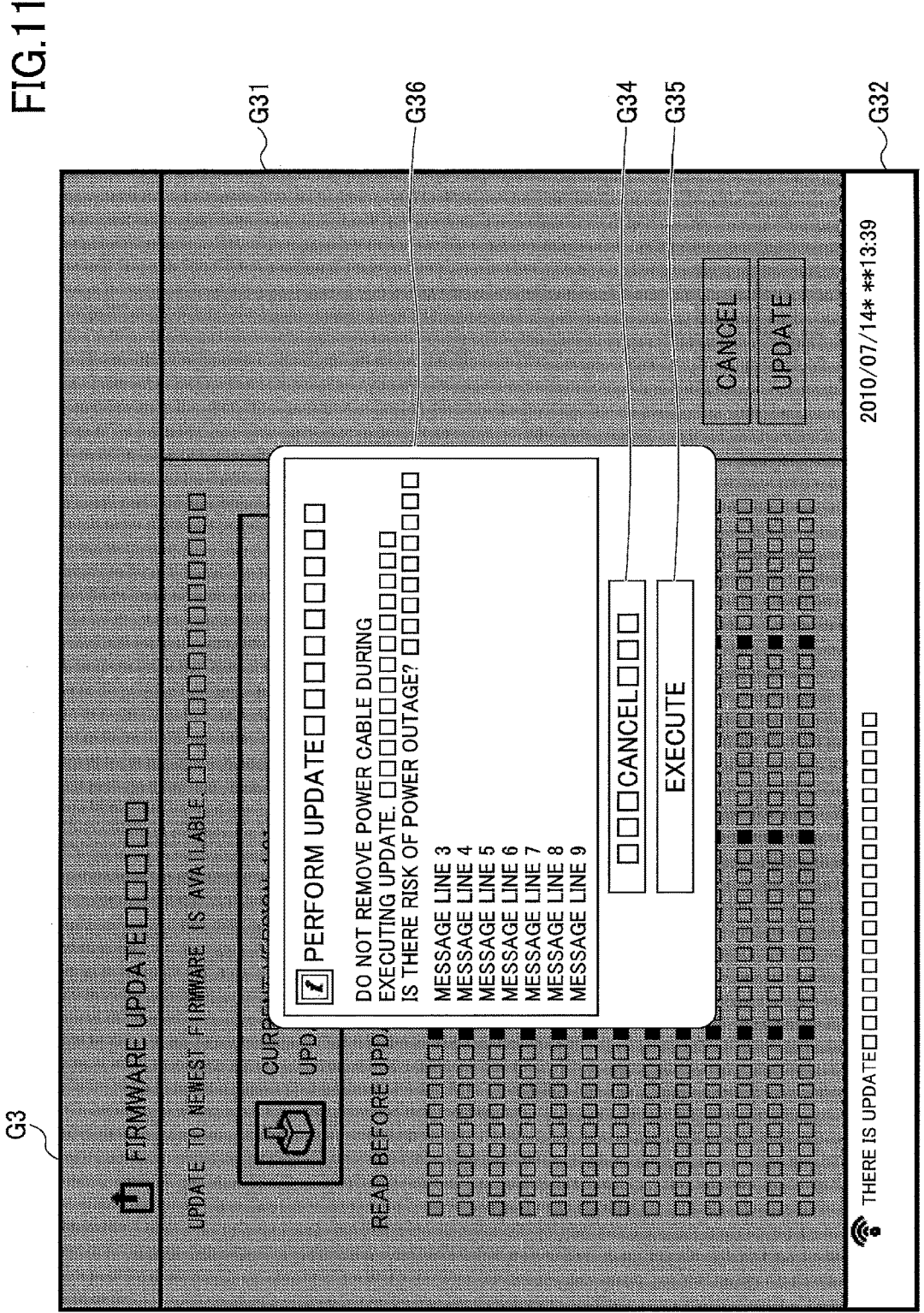
FIG. 11 is a diagram illustrating an example of a confirmation window.

FIG. 11 is a conceptual diagram illustrating an example of a confirmation window G36. In the confirmation screen G3, in a case in which the operation button G35 that instructs execution of the update is selected, the confirmation window G36 that prompts the user to confirm again may be displayed. In the confirmation window G36, in addition to information such as the version number of the newest version, update to which is to be performed, preset cautions when performing the update, and the like are displayed. In the confirmation screen G3, user's attention calling can be prompted by displaying the confirmation window G36 in a case in which the execution of the update is instructed. It should be noted that the confirmation window G36 may be configured to further display information as to whether or not a restart is performed.

Referring back to FIG. 7, the update unit 1103 determines whether or not to execute the update based on the selection operation of the operation button G34 or G35 on the confirmation screen G3 (Step S15). When the operation button G35 that instructs the execution of the update is selected (YES in Step S15), the update unit 1103 executes an update process according to the obtained metadata (Step S16).

In a case in which the operation button G35 is not selected as in a case in which the operation button G34 that cancels the execution of the update is selected (NO in Step S15), the update unit 1103 determines whether or not the update that has not been executed includes a forced update based on a description of the "force_update" of the obtained metadata (Step S17). In a case in which a forced update is included (YES in Step S17), the update unit 1103 performs a termination process of terminating the process of the phone terminal 11 (Step S18) and powers off the phone terminal 11. In this way, because even making a call cannot be executed in a case in which the forced update is not executed, the power of the apparatus is turned off to prevent vain operations. On the other hand, in a case in which the forced update is not included (NO in Step S17), the update unit 1103 causes normal operation to continue because the update is not executed at the present time (Step S19). In this way, a user can give a higher priority to calling than to the update.

That is, in the phone terminal 11, in a case in which there is an update of the phone terminal 11, the user notification unit 1104 of the user interface unit 1102 notifies the user of the presence of the update. Then, in the phone terminal 11, the operation input receiving unit 1105 receives the selection operation as to whether or not to execute the update from the user. In a case in which the selection operation to execute the update is made, the update process is executed by the update unit 1103. Thus, the phone terminal 11 can allow, in a case in which there is an update to be executed in the phone terminal 11, a user to select the execution of the update.

On the other hand, in a case in which there is no executable update (NO in Step S10), the update unit 1103 determines whether or not there is update data that is downloadable in advance (Step S200). Here, the update unit 1103 determines, depending on whether or not there is "valid date" of metadata that is set later than the current time, whether or not there is update data that is downloadable in advance.

In a case in which there is no data downloadable in advance (NO in Step S200), because neither the update nor the advance download needs to be performed, the update unit 1103 causes normal operation to continue (Step S19). Further, in a case in which there is data downloadable in advance (YES in Step S200), the update unit 1103 performs an advance download process (Step S202), and thereafter causes normal operation to continue (Step S19).

Figure 12:
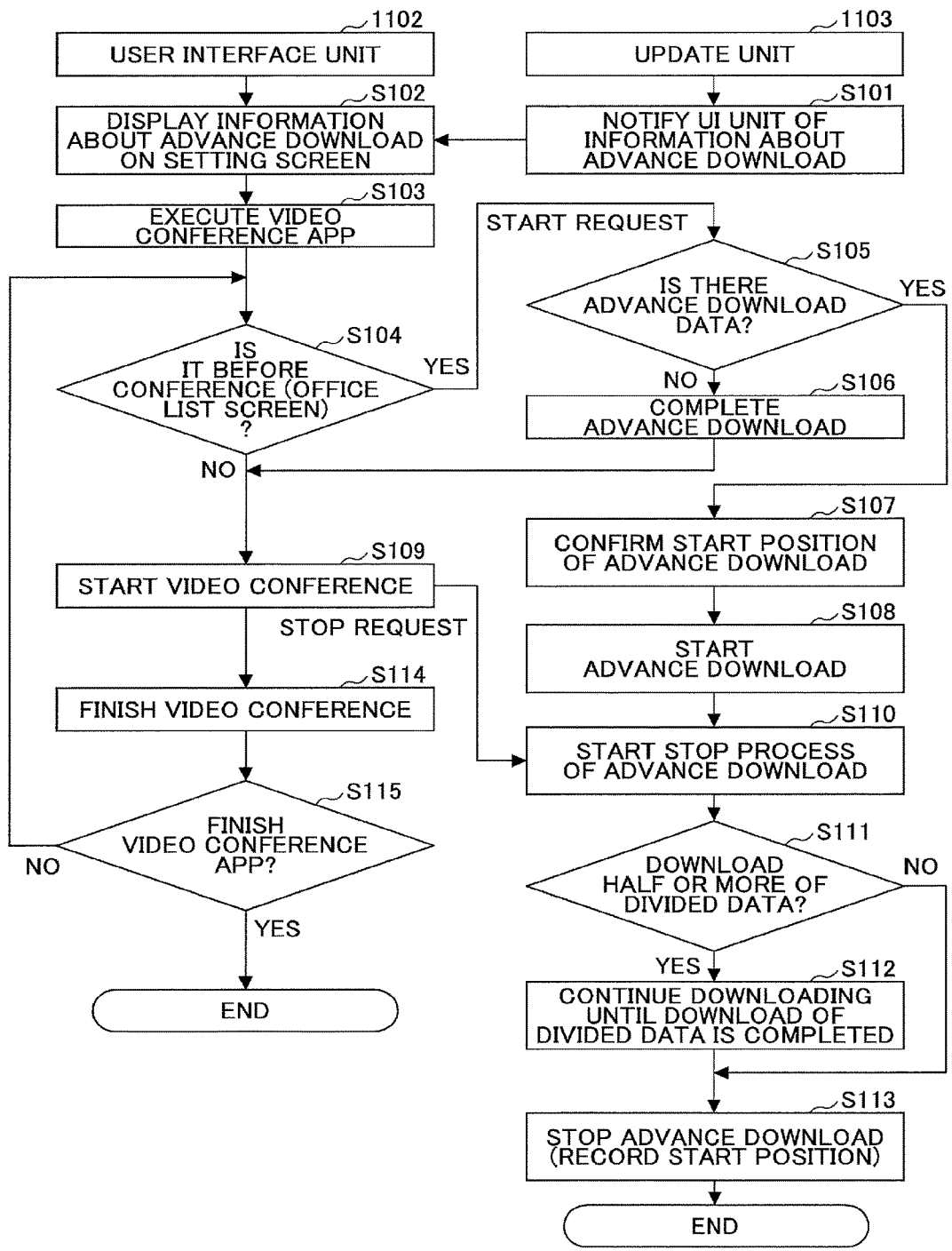
FIG. 12 is a flowchart (part 2) illustrating a process example of the phone terminal.

FIG. 12 is a diagram illustrating an advance download operation performed by the update unit 1103 together with the user interface unit 1102.

In FIG. 12, in a case in which there is data downloadable in advance, the update unit 1103 notifies the user interface unit 1102 of information about the advance download (Step S101).

The user interface unit 1102 notifies a user that there is data downloadable in advance by, for example, displaying such a screen as that illustrated in FIG. 13. That is, the user interface unit 1102 displays the information about the advance download on the setting screen (Step S102).

As shown in FIG. 13, the setting screen G4 is a configuration containing a main screen G41 where setting buttons G23 to G25, and G42 that receive selection operations of the user by the operation input receiving unit 1105 in order to perform various settings are displayed. The setting button G42, among the configuration buttons G23 to G25, and G42, is a button for instructing execution of an update. A version number of the newest version, advance update to which is to be performed, and the like may be written on the setting button G42 based on the data item "version" contained in information about the advance update. In the illustrated example, there is a description that the advance update to the newest version whose version number is 2.1 is available. It should be noted that the setting screen G4 may be configured to further display a status screen where a status of the phone terminal 11 is displayed.

Referring back to FIG. 12, when the user interface unit 1102 executes (starts) a video conference application (Step S103), as shown in FIG. 8, it becomes a startup screen (office list screen) that is a state of waiting own start of the video conference or an incoming call from a partner.

Subsequently, the user interface unit 1102 determines whether or not it is before a video conference (Step S104). That is, in a case in which the advance download is automatically performed, the advance download is required to be performed in a "case that is not a situation requiring the network bandwidth" including a case in which a video conference is not being performed. It is difficult to determine what each application on the phone terminal performs and what kind of influence does the performed process have on the network bandwidth. Thus, in order to determine a situation in which the video conference is not performed definitely and functions using the network bandwidth are not used, a state in which the video conference application is activated and the video conference is not started is determined. That is, it is apparent that functions of other applications are removed because the video conference application is being activated. Further, it is apparent that it is not a state, in which the network bandwidth is greatly consumed, because the video conference is not started.

In a case in which it is before the video conference (YES in Step S104), that is, when it is the office list screen, the advance down load is performed and the user interface unit 1102 makes a start request to the update unit 1103.

Receiving the start request, the update unit 1103 confirms whether or not there is advance download data (Step S105). When the whole download is already finished and there is no advance download data (No in Step S105), the update unit 1103 completes the advance download (Step S106) and notifies the user interface unit 1102 of the completion.

Further, in a case in which there is advance download data (YES in Step S105), the update unit 1103 confirms a start position of the advance download (Step S107) and starts the advance download (Step S108). FIG. 14B indicates an example of a download start position management table that holds the start position. The update unit 1103 can know the start position by referring to the download start position management table.

Referring back to FIG. 12, in a case in which it is not before the video conference (No in Step S104), the advance download is continued when it remains the office list screen in the user interface unit 1102, however, when the video conference is started (Step S109), the user interface unit 1102 requests the update unit 1103 to stop the advance download.

When receiving the stop request, the update unit 1103 starts a process for the stop (Step S110). Here, if the stop request is made at a point of time at which half or more of divided data is downloaded (YES in Step S111), downloading is continued until the divided data in the middle of being downloaded is finished (Step S112), and the process ends as soon as the downloading is finished (Step S113). In a case in which the stop request comes when a downloaded amount is half or less of the divided data (NO in Step S111), the downloading is stopped at the point of time immediately, and finished (Step S113). When the advance download is stopped, the start position is also recorded.

Figure 14A:
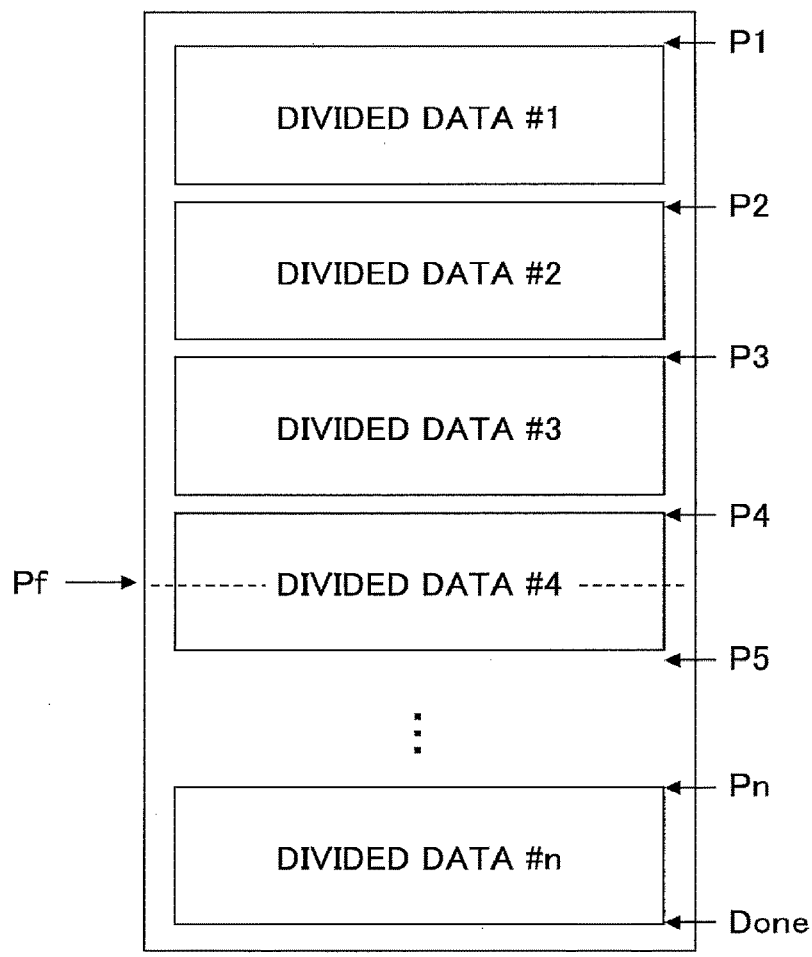
FIG. 14A is a diagram illustrating an example of determination of a stop of an advance download.
Figure 14B:
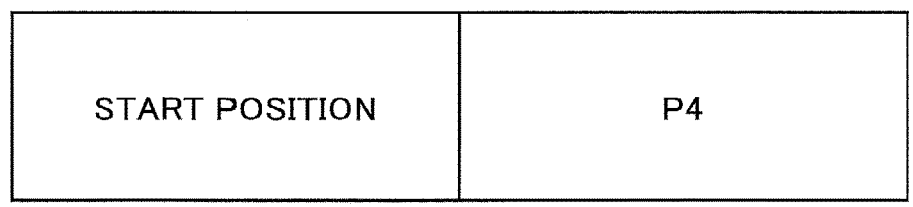
FIG. 14B is a diagram illustrating an example of the determination of the stop of the advance download and a start position when being restarted.

FIG. 14A illustrates an example of determination of the stop of the advance download and the start position when being restarted. That is, when the stop request comes, the update unit 1103 determines how far the divided data in the middle of being downloaded is downloaded. In a case in which a download completion position Pf when the stop request comes is half or less of the divided data #4 in FIG. 14A, the download of the divided data #4 is stopped (discard an already downloaded part of the divided data #4) and a beginning position P4 of the divided data #4 is stored in the download start position management table of FIG. 14B as a restart position of next time download in order to download the divided data #4 again. If the download completion position Pf is a position at half or more of the divided data #4, the update unit 1103 continues downloading the divided data #4 and stops the download after the download of the divided data #4 is finished. At that time, the update unit 1103 stores a beginning position P5 of next divided data #5 in the download start position management table as the next time start position (restart position). When receiving the request for starting the download, the update unit 1103 restarts the download from the start position written in the download start position management table.

Further, as a method for stopping the advance download, in order to eliminate influence of the download on the network band from the moment when the stop request comes, there is a method in which the update unit 1103 stops the advance download immediately in a case in which the stop request comes. In this case, it is stopped immediately regardless of whether the download completion position Pf in FIG. 14A is at half or more of the divided data #4 or at half or less of the divided data #4. Thus, the update unit 1103 stores the beginning position P4 of the divided data #4 in the download start position management table. It should be noted that although a case in which it is determined depending on whether or not the divided data exceeds half is described, it may be determined depending on whether or not it exceeds half of the whole of the advance download data. Moreover, for both the divided data and the whole of the advance download data, instead of determining depending on whether or not it exceeds half, it may be determined depending on whether or not it exceeds another predetermined value (ratio).

Referring back to FIG. 12, in a case in which the video conference is finished (Step S114) and the video conference application is also finished as it is (YES in Step S115), the advance download is finished once, and the advance download is to be restarted when the video conference application is executed anew next time (Step S103).

In a case in which the video conference is finished but the video conference app itself is not finished (NO in Step S115), the user interface unit 1102 makes the start request to the update unit 1103 again because it returns to the office list screen (YES in Step S104). The update unit 1103 performs the process again from confirming whether or not there is advance download data (Step S105).

Figure 16:
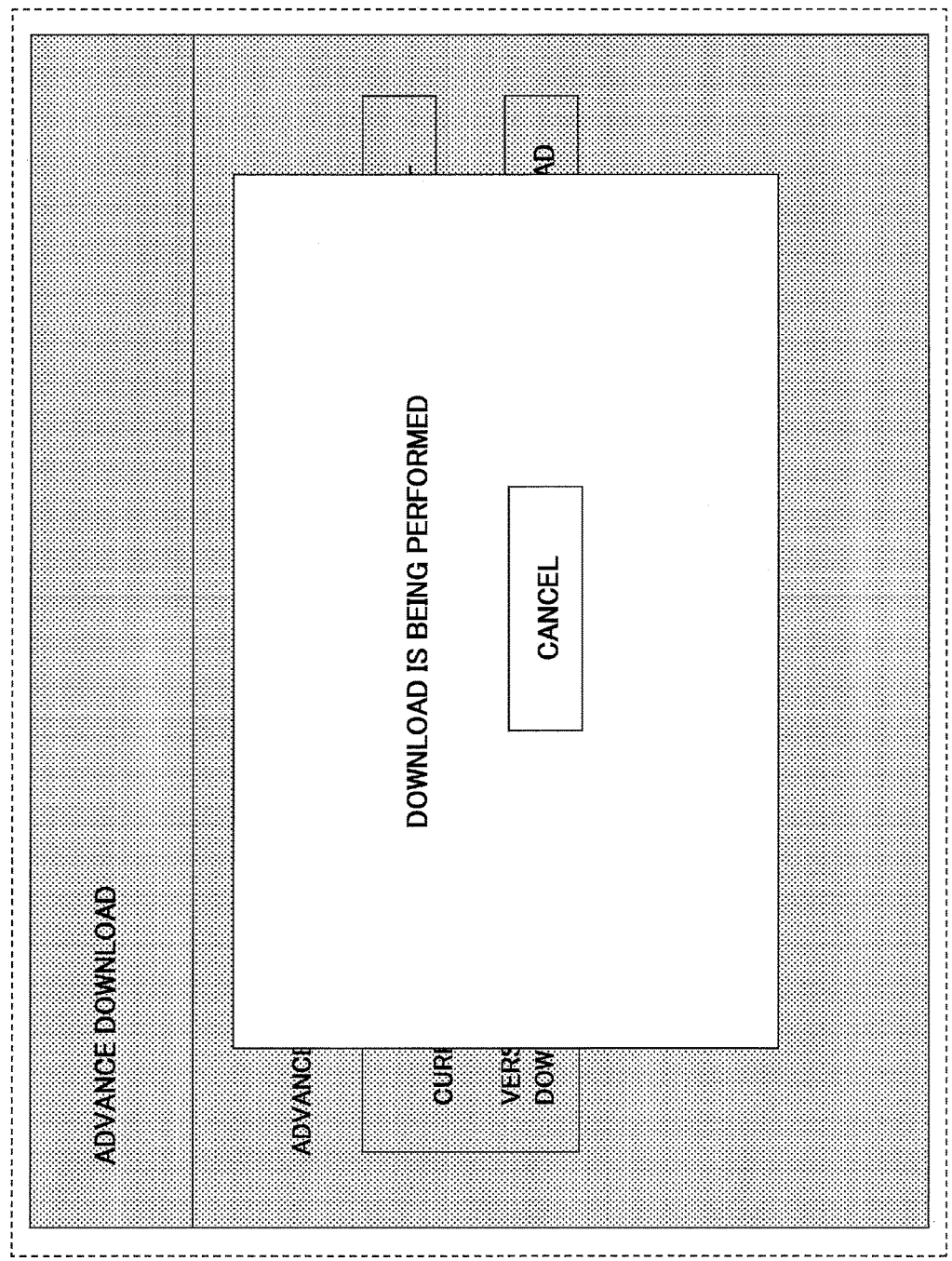
FIG. 16 is a diagram illustrating an example of a screen while executing the advance download.

In the above described process example, a case is described in which the phone terminal automatically performs the advance download when the condition is satisfied. However, it can be executed by the user selecting an execution button of the advance download. In this case, it can be executed by selecting the download button G53 from the confirmation screen of the advance download as shown in FIG. 15. In this case, the user can wait until the completion of the download, and it can be cancelled by the cancel button as shown in FIG. 16 while executing the advance download. In a case in which the advance download is performed by a manual operation of the user, quality degradation of the video conference can be prevented by precluding the start of the video conference until the download is completed.

Next, the update process (Step S16 shown in FIG. 7) will be described in detail with reference to FIG. 17.

In FIG. 17, when the update process is started, the update unit 1103 disables interface units such as the image sensor I/F 112 and the audio input/output I/F 113 for connecting to external devices such as the camera 12, the microphone 14, and the speaker 15. If the interface units are operating, because the program 104 associated with the interface units is being used, an error may occur in the update. To prevent this error, the update unit 1103 disables the interface units described above in accordance with the start of the update process.

Subsequently, the update unit 1103 obtains, from "files" of obtained metadata, a file list of data files (update data) used for the update and checksums of the files (Step S5101). In a case in which a plurality of pieces of metadata of a plurality of versions having a dependence relationship have been obtained, the update unit 1103 performs a process from Step S1501 to Step S1508 in order from older version numbers.

Subsequently, based on a date and time when the update described in the "valid date" of the obtained metadata becomes executable, the update unit 1103 determines whether or not the update using the data files (update data) corresponding to the obtained metadata is executable (Step S1502). In the embodiment, in a case in which the time and date described in the "valid date" of the obtained metadata is earlier than the current time and date, which is obtained from a clocking unit contained by the phone terminal 11 or the NTP server for example, the update unit 1103 determines that the update using the data files (update data) corresponding to the obtained metadata is executable.

In a case in which it is determined that the update data using the data files corresponding to the obtained metadata is executable (YES in Step S1502), the update unit 1103 determines whether or not the data files corresponding to the obtained metadata have been downloaded from the update server 60 by the advance download process (Step S1503). That is, the update unit 1103 determines whether or not the data files corresponding to the obtained metadata are advance download data.

In a case in which it is determined that the data files have not been downloaded from the update server 60 by the advance download process (NO in Step S1503), the update unit 1103 obtains, from the update server 60, the data files (update data) of the file list obtained in step S1501 (Step S1504) and obtains checksums of the obtained data files (Step S1505). On the other hand, in a case in which it is determined that the data files have been downloaded from the update server 60 by the advance download process (YES in Step S1503), the update unit 1103 obtains, from a download destination (for example, the storage unit 105), the data files (advance download data) that have been downloaded by the advance download process and obtains checksums of the obtained data files (Step S1505). Subsequently, the update unit 1103 executes the update of the program 104 stored in the storage unit 105 using the obtained data files.

Subsequently, the update unit 1103 notifies the user interface unit 1102 of a progress status of the update (Step S1506). This notice of the progress status reports which data file(s), among the plurality of files included in the file list, has been processed through Steps S1504 and S1505. Further, in a case in which the update of the plurality of versions having the dependency relationship is to be performed, a version update to which is completed may be reported. The user interface unit 1102 displays the reported progress status of the update on the display 13 and notifies the user.

FIG. 18 is a diagram illustrating an example of an update screen displayed by the phone terminal. As shown in FIG. 18, an update screen G6 is a screen displayed by the user interface unit 1102 on the display 13 during the update process performed by the update unit 1103. In the update screen G6, an update status window G61 that displays the progress status of the update reported from the update unit 1103 and an operation button G62 for instructing to stop the update are displayed. The user can confirm the progress status of the update according to display contents of the update status window G61.

Further, the user interface unit 1102 may display, on the update screen G6, a remaining-time of the update and current line speed in real time. In this case, there is an advantage that the user can recognize the status of the update in more detail.

Referring back to FIG. 17, the update unit 1103 determines whether or not there is an error of the update process (Step S1507). In a case in which there is an error in the update process (YES in Step S1507), the process proceeds to Step S1509. In the embodiment, in addition to errors (e.g., discrepancy between the checksum obtained in Step S1505 and the checksum obtained in Step S1501) caused by some factor while executing the update, the update unit 1103 also determines a stop of the update according to an operation of the operation button G62 of the update screen G6 or a case in which a restart is required by the version of the update performed in Steps S1504 and S1505, as an error. Accordingly, in a case in which updates are performed in order from an older version number, processing exits from the process of Steps S1501 through S1508 in the stage where the update of the version that requires a restart is performed.

In a case in which there is no error in the update process (NO in Step S1507), the update unit 1103 determines whether or not the update of all the versions related to the obtained metadata is completed (Step S1508). In a case in which the update of all the versions is not completed (NO in Step S1508), it returns to Step S1501 and the update process is continued. In a case in which the update of all the versions is completed (YES in Step S1508), it proceeds to Step S1509.

The update unit 1103 notifies the user interface unit 1102 of a result of the update (Step S1509). The user interface unit 1102 displays the reported result of the update on the display 13 and notifies the user.

FIG. 19 is a diagram illustrating an example of a confirmation screen displayed by the phone terminal. The user interface unit 1102, which receives the result of the update, displays an update result G71 and operation buttons G72 and G73 for receiving operations of the shutdown and the restart after the update on the confirmation screen G7 as shown in FIG. 19. In addition to information related to a version before the update, information related to the current version according to the update and the like are displayed in the update result G71. According to display contents of the update result G71, the user can confirm the result of the update.

Referring back to FIG. 17, the update unit 1103 determines whether or not a restart of the information processing apparatus (phone terminal) 11 is required based on the description of the "require_reboot" contained in the metadata of the update data used in the update (Step S1510). In a case in which a restart of the information processing apparatus 11 is not required (NO in Step S1510), the update unit 1103 terminates the update process without restarting the information processing apparatus 11. In a case in which a restart of the information processing apparatus 11 is required (YES in Step S1510), the update unit 1103 restarts the information processing apparatus 11 (Step S1511). In this way, in a case in which an update that requires a restart is executed, it is restarted after the update without being operated by the user.

<Review>

As described above, according to the embodiment, unintended degradation of quality of the video conference or the like can be prevented.

As above, the present invention is described according to the preferable embodiment of the present invention. Although the present invention is described by indicating the specific examples, it is apparent that various modifications and changes can be added to these specific examples without departing from the extensive points and the scope of the present invention defined in the claims. That is, the present invention should not be limited by the details of the specific examples and the attached drawings Although the communication apparatus is described according to the embodiment, the present invention is not limited to the embodiment, but various variations and modifications may be made within the contents of the present invention.

What is claimed is:

1. A communication method comprising:
   receiving metadata of update data used for an update to a communication terminal connectable to an update server;
   determining, based on a description of the metadata, whether or not there is update data that is subject to advance download in which download of the update data is performed before a point of time at which the update is able to start;
   determining whether or not it is time to perform the advance download;
   downloading the update data in a case in which it is determined that there is the update data that is subject to the advance download in said determining whether or not there is update data and it is determined that it is the time to perform the advance download in said determining whether or not it is the time to perform the advance download; and
   determining that it is the time to perform the advance download and start or restart the advance download, in a case in which a video conference application is activated and a video conference is not started, wherein in a case in which the video conference is started, said determining determines that it is not the time to perform the advance download and stops the advance download, and wherein in a case in which said determining determines that it is not the time to perform the advance download and stops the advance download, the advance download is stopped after downloading all data being downloaded in a case in which a downloaded data amount is equal to or greater than half of the data being download.

2. The communication method according to claim 1, wherein the data is divided data, and the data amount is a data amount of the divided data being downloaded.

3. A communication terminal comprising:

circuitry having memory, the circuitry configured to receive metadata of update data used for an update from an update server via a network, determine, based on a description of the metadata, whether or not there is update data that is subject to advance download in which download of the update data is performed before a point of time at which the update is able to start, determine whether or not it is time to perform the advance download, download the update data in a case in which the determination determines that there is the update data that is subject to the advance download and the determination determines that it is the time to perform the advance download, and determine that it is the time to perform the advance download and start or restart the advance download, in a case in which a video conference application is activated and a video conference is not started, wherein in a case in which the video conference is started, the circuitry determines that it is not the time to perform the advance download and stops the advance download, and wherein in a case in which the circuitry determines that it is not the time to perform the advance download and stops the advance download, the circuitry stops the advance download after downloading all data being downloaded in a case in which a downloaded data amount is equal to or greater than half of the data being download.

4. The communication terminal according to claim 3, wherein in a case in which the circuitry determines that it is not the time to perform the advance download and stops the advance download, the circuitry stops the advance download while discarding data being downloaded in a case in which a downloaded data amount is equal to or less than half of the data being download.

5. The communication terminal according to claim 3, wherein the data is divided data, and the data amount is a data amount of the divided data being downloaded.

6. The communication terminal according to claim 3, wherein the circuitry is configured to determine whether or not there is advance download data for advanced downloading after the determining determines that it is the time to perform the advance download.

7. The communication terminal according to claim 6, wherein the circuitry determines there is not advance download data for advanced downloading when all of the update data has already been downloaded.

8. The communication terminal according to claim 3, wherein the advanced download is performed and completed prior to start of the video conference.

9. A communication system including an update server and a communication terminal connectable via a network, wherein the update server includes:

circuitry configured to provide update data and metadata in response to a request from the communication terminal, receive the metadata of the update data used for an update, determine, based on a description of the metadata, whether or not there is update data that is subject to advance download in which download of the update data is performed before a point of time at which the update is able to start, determine whether or not it is time to perform the advance download, download the update data in a case in which the determination determines that there is the update data that is subject to the advance download and the determination determines that it is the time to perform the advance download, and determine that it is the time to perform the advance download and start or restart the advance download, in a case in which a video conference application is activated and a video conference is not started, wherein in a case in which the video conference is started, the circuitry determines that it is not the time to perform the advance download and stops the advance download, and wherein in a case in which the circuitry determines that it is not the time to perform the advance download and stops the advance download, the circuitry stops the advance download after downloading all data being downloaded in a case in which a downloaded data amount is equal to or greater than half of the data being download.

10. The communication system according to claim 9, wherein in a case in which the circuitry determines that it is not the time to perform the advance download and stops the advance download, the circuitry stops the advance download while discarding data being downloaded in a case in which a downloaded data amount is equal to or less than half of the data being download.

11. The communication system according to claim 9, wherein the data is divided data, and the data amount is a data amount of the divided data being downloaded.

12. The communication system according to claim 9, wherein the advanced download is performed and completed prior to start of the video conference.

* * * * *